United States Patent
Jing et al.

(10) Patent No.: US 10,208,190 B2
(45) Date of Patent: Feb. 19, 2019

(54) HYDROPHILIC COATINGS, ARTICLES, COATING COMPOSITIONS, AND METHODS

(71) Applicant: 3M INNOVATIVE PROPERTIES COMPANY, St. Paul, MN (US)

(72) Inventors: Naiyong Jing, Woodbury, MN (US); Zhigang Yu, Shanghai (CN); Xue-hua Chen, Shanghai (CN); Bangwei Xi, Shanghai (CN); Appuswamy Devasenapathi, Singapore (SG); WeiDe Liu, Shanghai (CN); George VanDyke Tiers, St. Paul, MN (US); Justin A. Riddle, St. Paul, MN (US); Deivaraj Theivanayagam Chairman, Singapore (SG); Michelle L. Legatt, St. Paul, MN (US); Cecil V. Francis, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 502 days.

(21) Appl. No.: 14/688,200

(22) Filed: Apr. 16, 2015

(65) Prior Publication Data
US 2015/0218351 A1    Aug. 6, 2015

Related U.S. Application Data

(62) Division of application No. 13/378,182, filed as application No. PCT/US2010/040524 on Jun. 30, 2010, now Pat. No. 9,034,489.
(Continued)

(30) Foreign Application Priority Data

Jul. 3, 2009    (CN) .......................... 2009 1 0151003

(51) Int. Cl.
*C08K 9/06*     (2006.01)
*C03C 17/30*   (2006.01)
(Continued)

(52) U.S. Cl.
CPC ................ *C08K 9/06* (2013.01); *B82Y 30/00* (2013.01); *C03C 17/007* (2013.01); *C03C 17/30* (2013.01);
(Continued)

(58) Field of Classification Search
CPC ... B82Y 30/00; C01P 2004/64; C03C 17/007; C03C 17/30; C08K 3/36; C08K 9/06;
(Continued)

(56) References Cited

U.S. PATENT DOCUMENTS 2,366,516 A    1/1945 Geffcken
2,432,484 A   12/1947 Moulton
(Continued)

FOREIGN PATENT DOCUMENTS

CN     1884409    12/2006
CN   101579672     5/2008
(Continued)

OTHER PUBLICATIONS

Abe, "Anti-Reflective Coatings for CRTs by Sol-Gel Process", Journal of Sol-Gel Science and Technology, 2001, vol. 22, Nos. 1-2, pp. 151-166.
(Continued)

*Primary Examiner* — Shuangyi Abu Ali
(74) *Attorney, Agent, or Firm* — Adrian L. Pishko

(57) ABSTRACT

A coating composition which imparts antifog, antireflective, easy-cleaning, and/or antistatic properties to substrates coated therewith. The coating compositions utilize nanopar-
(Continued)

ticles functionalized with amine groups and/or protected amine groups, and amine-reactive groups.

9 Claims, 2 Drawing Sheets

Related U.S. Application Data

(60) Provisional application No. 61/236,672, filed on Aug. 25, 2009.

(51) Int. Cl.
    C09K 3/16      (2006.01)
    C03C 17/00    (2006.01)
    C09D 5/00      (2006.01)
    C09K 3/18      (2006.01)
    B82Y 30/00    (2011.01)
    C09C 1/30      (2006.01)
    C09D 1/00      (2006.01)
    C09D 7/62      (2018.01)
    C08K 3/36      (2006.01)

(52) U.S. Cl.
    CPC .............. *C09C 1/3081* (2013.01); *C09D 1/00* (2013.01); *C09D 5/00* (2013.01); *C09D 5/006* (2013.01); *C09D 7/62* (2018.01); *C09K 3/16* (2013.01); *C09K 3/18* (2013.01); *C01P 2004/64* (2013.01); *C08K 3/36* (2013.01); *Y10T 428/269* (2015.01); *Y10T 428/29* (2015.01); *Y10T 428/2982* (2015.01); *Y10T 428/2991* (2015.01); *Y10T 428/315* (2015.01)

(58) Field of Classification Search
    CPC .......... C09C 1/3081; C09D 1/00; C09D 5/00; C09D 5/006; C09D 7/62; C09K 3/16; C09K 3/18; Y10T 428/269; Y10T 428/29; Y10T 428/2982; Y10T 428/2991; Y10T 428/315
    See application file for complete search history.

(56) References Cited

U.S. PATENT DOCUMENTS

| | | |
|---|---|---|
| 2,536,764 A | 1/1951 | Moulton |
| 2,601,123 A | 6/1952 | Moulton |
| 2,801,185 A | 7/1957 | Iler |
| 2,803,552 A | 8/1957 | Stedman |
| 3,075,228 A | 1/1963 | Elias |
| 3,337,351 A | 8/1967 | Morehouse |
| 3,507,897 A | 4/1970 | Kanner |
| 3,819,522 A | 6/1974 | Zmoda |
| 3,976,497 A | 8/1976 | Clark |
| 4,152,165 A | 5/1979 | Langager |
| 4,275,118 A | 6/1981 | Baney |
| 4,338,377 A | 7/1982 | Beck |
| 4,467,073 A | 8/1984 | Creasy |
| 4,478,909 A | 10/1984 | Taniguchi |
| 4,504,109 A | 3/1985 | Taga |
| 4,507,547 A | 3/1985 | Taga |
| 4,522,958 A | 6/1985 | Das |
| 4,816,333 A | 3/1989 | Lange |
| 4,876,039 A | 10/1989 | Lo |
| 4,944,294 A | 7/1990 | Borek, Jr. |
| 5,126,394 A | 6/1992 | Revis |
| 5,204,219 A | 4/1993 | Van Ooij |
| 5,221,497 A | 6/1993 | Watanabe |
| 5,286,782 A | 2/1994 | Lamb |
| 5,354,797 A | 10/1994 | Anderson |
| 5,464,900 A | 11/1995 | Stofko, Jr. |
| 5,585,186 A | 12/1996 | Scholz |
| 5,597,512 A | 1/1997 | Watanabe |
| 5,637,368 A | 6/1997 | Cadalbert |
| 5,639,546 A | 6/1997 | Bilkadi |
| 5,709,930 A | 1/1998 | DePauw |
| 5,723,175 A | 3/1998 | Scholz |
| 5,753,373 A | 5/1998 | Scholz |
| 5,756,226 A | 5/1998 | Valentini |
| 5,820,978 A | 10/1998 | Huang |
| 5,873,931 A | 2/1999 | Scholz |
| 5,922,299 A | 7/1999 | Bruinsma |
| 5,989,515 A | 11/1999 | Watanabe |
| 5,997,621 A | 12/1999 | Scholz |
| 6,013,724 A | 1/2000 | Mizutani |
| 6,040,053 A | 3/2000 | Scholz |
| 6,040,378 A | 3/2000 | Sanduja |
| 6,096,469 A | 8/2000 | Anderson |
| 6,165,256 A | 12/2000 | Hayakawa |
| 6,251,523 B1 | 6/2001 | Takahashi |
| 6,258,969 B1 | 7/2001 | Sawai |
| 6,291,535 B1 | 9/2001 | Watanabe |
| 6,352,780 B1 | 3/2002 | Sanduja |
| 6,395,149 B1 | 5/2002 | Palmgren |
| 6,428,898 B1 | 8/2002 | Barsotti |
| 6,467,897 B1 | 10/2002 | Wu |
| 6,544,593 B1 | 4/2003 | Nagata |
| 6,599,976 B2 | 7/2003 | Kobayashi |
| 6,605,683 B1 | 8/2003 | Zhang |
| 6,620,514 B1 | 9/2003 | Arpac et al. |
| 6,727,309 B1 | 4/2004 | Paiva |
| 6,767,984 B2 | 7/2004 | Toui |
| 6,797,391 B2 | 9/2004 | Shibato |
| 6,838,178 B1 | 1/2005 | Strickler |
| 6,858,306 B1 | 2/2005 | Strickler |
| 6,918,957 B2 | 7/2005 | Kursawe |
| 6,921,578 B2 | 7/2005 | Tsujino |
| 7,022,416 B2 | 4/2006 | Teranishi |
| 7,066,998 B2 | 6/2006 | Rohrbaugh |
| 7,074,463 B2 | 7/2006 | Jones |
| 7,179,513 B2 | 2/2007 | Jones |
| 7,264,872 B2 | 9/2007 | Walker, Jr. |
| 7,282,272 B2 | 10/2007 | Jones |
| 7,297,810 B2 | 11/2007 | Walker, Jr. |
| 7,309,517 B2 | 12/2007 | Jones |
| 7,326,448 B2 | 2/2008 | Jones |
| 7,348,054 B2 | 3/2008 | Jacquiod |
| 7,369,122 B2 | 5/2008 | Cross |
| 7,491,441 B2 | 2/2009 | Pokorny |
| 7,547,476 B2 | 6/2009 | Jones |
| 7,879,449 B2* | 2/2011 | Jeon .................... A47J 36/025 428/331 |
| 7,973,096 B2 | 7/2011 | Anderson |
| 8,147,918 B2 | 4/2012 | Standke et al. |
| 8,318,831 B2 | 11/2012 | Zech |
| 2001/0051213 A1 | 12/2001 | Schulz |
| 2002/0090519 A1 | 7/2002 | Kursawe |
| 2004/0068035 A1 | 4/2004 | Paiva |
| 2004/0219348 A1 | 11/2004 | Jacquiod |
| 2004/0237833 A1 | 12/2004 | Sepeur |
| 2005/0095420 A1 | 5/2005 | Berni |
| 2005/0233135 A1 | 10/2005 | Iyer |
| 2005/0266248 A1 | 12/2005 | Millero |
| 2006/0062923 A1 | 3/2006 | Dilley |
| 2006/0093786 A1 | 5/2006 | Ohashi |
| 2006/0147674 A1 | 7/2006 | Walker, Jr. |
| 2006/0204655 A1 | 9/2006 | Takahashi |
| 2006/0204676 A1 | 9/2006 | Jones |
| 2006/0204679 A1 | 9/2006 | Jones |
| 2006/0210726 A1 | 9/2006 | Jones |
| 2006/0269724 A1 | 11/2006 | Ohashi |
| 2007/0008439 A1* | 1/2007 | Nakayama ............. B82Y 20/00 349/2 |
| 2007/0051274 A1 | 3/2007 | Saito |
| 2007/0104922 A1 | 5/2007 | Zhai |
| 2007/0190789 A1* | 8/2007 | Carter ....................... C09G 1/02 438/692 |
| 2007/0237943 A1* | 10/2007 | Wakizaka ............. B82Y 30/00 428/328 |
| 2007/0275042 A1 | 11/2007 | Anderson |
| 2007/0292679 A1 | 12/2007 | Pellerite |
| 2008/0032053 A1 | 2/2008 | Kourtakis |

(56) References Cited

U.S. PATENT DOCUMENTS

| | | |
|---|---|---|
| 2008/0057187 A1 | 3/2008 | Trapp |
| 2008/0070030 A1 | 3/2008 | Baran |
| 2008/0124539 A1 | 5/2008 | Kawai |
| 2008/0138538 A1 | 6/2008 | Lewis |
| 2008/0268062 A1 | 10/2008 | Baran |
| 2009/0025727 A1 | 1/2009 | Klun |
| 2009/0289225 A1 | 11/2009 | Jing |
| 2010/0035039 A1 | 2/2010 | Jing |
| 2010/0092763 A1 | 4/2010 | Kleiman-Shwarsctein |
| 2010/0092765 A1 | 4/2010 | Hager |
| 2010/0101649 A1 | 4/2010 | Huignard |
| 2010/0209946 A1 | 8/2010 | Jing |
| 2010/0304154 A1* | 12/2010 | Batenburg ............ B82Y 30/00 428/446 |
| 2011/0033694 A1 | 2/2011 | Jing |
| 2012/0052289 A1 | 3/2012 | Jing |
| 2013/0045387 A1 | 2/2013 | Chu |

FOREIGN PATENT DOCUMENTS

| | | |
|---|---|---|
| DE | 10239762 | 3/2004 |
| EP | 0145308 | 6/1985 |
| EP | 0263428 | 4/1988 |
| EP | 0372756 | 6/1990 |
| EP | 0424006 | 4/1991 |
| EP | 0570165 | 11/1993 |
| EP | 1132448 | 9/2001 |
| GB | 1454960 | 11/1976 |
| GB | 2041956 | 9/1980 |
| GB | 2137648 | 10/1984 |
| JP | 59015473 | 1/1984 |
| JP | 1985044147 | 10/1985 |
| JP | 1985044148 | 10/1985 |
| JP | 1985044149 | 10/1985 |
| JP | 05163463 | 6/1993 |
| JP | 06-080852 | 3/1994 |
| JP | 07-068714 | 3/1995 |
| JP | 08-012903 | 1/1996 |
| JP | 11-293157 | 4/1998 |
| JP | 11-076928 | 3/1999 |
| JP | 2002-511509 | 4/2002 |
| JP | 2003160759 | 6/2003 |
| JP | 2004083846 | 3/2004 |
| JP | 2006321957 | 11/2006 |
| JP | 2007070395 | 3/2007 |
| JP | 2007320145 | 12/2007 |
| JP | 2007332262 | 12/2007 |
| JP | 2008542458 | 11/2008 |
| JP | 2009/098658 | 5/2009 |
| JP | 2009-524709 | 7/2009 |
| WO | WO 1996/18691 | 6/1996 |
| WO | WO 2000/00855 | 1/2000 |
| WO | WO 2005/067753 | 7/2005 |
| WO | WO 2006/054888 | 5/2006 |
| WO | WO 2006/099906 | 9/2006 |
| WO | WO 2007/017504 | 2/2007 |
| WO | WO 2007/143416 | 12/2007 |
| WO | WO 2008/069848 | 6/2008 |
| WO | WO 2008/103593 | 8/2008 |
| WO | WO 2008/131063 | 10/2008 |
| WO | WO 2009/009188 | 1/2009 |
| WO | WO 2009/085680 | 7/2009 |
| WO | WO 2009/140482 | 11/2009 |
| WO | WO 2010/103020 | 9/2010 |
| WO | WO 2011/142956 | 11/2011 |

OTHER PUBLICATIONS

Bragg, "The Form Birefringence of Macromolecules", Acta Crystallographica, Nov. 1953, vol. 6, No. 11-12, pp. 865-867.

Bravo, "Transparent Superhydrophobic Films Based on Silica Nanoparticles", Langmuir, Jun. 19, 2007, vol. 23, No. 13, pp. 7293-7298.

Cebeci, "Nanoporosity-Driven Superhydrophilicity: A Means to Create Multifunctional Antifogging Coatings", Langmuir, 2006, vol. 22, No. 6, pp. 2856-2862.

Cho, "Colloidal Indium Tin Oxide Nanoparticles for Transparent and Conductive Films", Thin Solid Films, Dec. 2006, vol. 515, Nos. 4-5, pp. 1864-1871.

Greene, "Protective Groups in Organic Synthesis", $2^{nd}$ Edition, John Wiley & Sons, Inc., New York, (1991).

Haas, "Functionalized coatings based on inorganic-organic polymers (ORMOCER®s) and their combination with vapor deposited inorganic thin films", Surface and Coatings Technology, Jan. 1999, vol. 111, No. 1, pp. 72-79.

Haas, "Functionalized coating materials based on inorganic-organic polymers", Thin Solid Films, Aug. 1999, vol. 351, Nos. 1-2, pp. 198-203.

Hattori, "Anti-Reflection Surface with Particle Coating Deposited by Electrostatic Attraction", Advanced Materials, Jan. 2001, vol. 13, No. 1, pp. 51-54.

Iler, "The Chemistry of Silica: Solubility, Polymerization, Colloid and Surface Properties, and Biochemistry", John Wiley & Sons, p. 665, (1979).

Irie, "Visible-light induced hydrophilicity on nitrogen-substituted titanium dioxide films", Chemical Communications, 2003, vol. 11, pp. 1298-1299.

Kang, "Material and rheological properties of (glycidoxypropyl) trimethoxysilane modified colloidal silica coatings", Korea-Australia Rheology Journal, Dec. 2004, vol. 16, No. 4, pp. 175-182.

Kim, "Two-layer hybrid anti-reflection film prepared on the plastic substrates", Current Applied Physics, Apr. 2002, vol. 2, No. 2, pp. 123-127.

Kocienski, "Protecting Groups", $3^{rd}$ Edition, Georg Thieme Verlag, Stuttgart, (2004).

Lee, "pH-Dependent Structure and Properties of $TiO_2/SiO_2$ Nanoparticle Multilayer Thin Films", Chemical Materials, Mar. 20, 2007, vol. 19, No. 6, pp. 1427-1433.

Liu, "Reversible Wettability of a Chemical Vapor Deposition Prepared ZnO Film between Superhydrophobicity and Superhydrophilicity", Langmuir, Jul. 6, 2004, vol. 20, No. 14, pp. 5659-5661.

Ma, "Polystyrene Nanocomposite Materials: Preparation, Morphology, and Mechanical, Electrical, and Thermal Properties", Journal of Applied Polymer Science, Dec. 2005, vol. 98, No. 5, pp. 2266-2273.

Masso, "Evaluation of Scratch Resistant and Antireflective Coatings for Plastic Lenses", Annual Technical Conference Proceedings—Society of Vacuum Coaters, (1989), 32nd, pp. 237-240.

McHale, "Topography Driven Spreading", Physical Review Letters, Jul. 2004, vol. 93, No. 3, pp. 036102-1-036102-4.

Meincken, "Determination of the hydrophilic character of membranes by pulsed force mode atomic force microscopy", Applied Surface Science, Dec. 2005, vol. 252, No. 5, pp. 1772-1779.

Ming, "Superhydrophobic Films from Raspberry-like Particles", Nano Letters, 2005, vol. 5, No. 11, pp. 2298-2301.

Nuraje, "Durable Antifog Films from Layer-by-Layer Molecularly Blended Hydrophilic Polysaccharides", Langmuir, 2011, vol. 27, No. 2, pp. 782-791.

Ohishi, "Preparation and Properties of Anti-reflection/Anti-static Thin Films for Cathode Ray Tubes Prepared by Sol-Gel Method Using Photoirradiation", Journal of Sol-Gel Science and Technology, 1997, vol. 8, Nos. 1-3, pp. 511-515.

Ohishi, "Preparation and properties of anti-reflection/anti-static thin films formed on organic film by photo-assisted sol-gel method", Journal of Non-Crystalline Solids, Dec. 2003, vol. 332, Nos. 1-3, pp. 87-92.

Okubo, "New Coating Materials Prepared by Radiation-induced Polymerization. I. Mar-resistant Coating Composition and Properties", Journal of Applied Polymer Science, Feb. 1978, vol. 22, No. 2, pp. 487-496.

Pal'Tsyn, "The Role of Agglutination in Bacterial Infection", Bulletin of Experimental Biology and Medicine, Jan. 1999, vol. 127, No. 1, pp. 1-4.

Plueddemann, "Silane Coupling Agents", Plenum Press, New York, p. 20, (1982).

(56) References Cited

OTHER PUBLICATIONS

Shang, "Optically Transparent Superhydrophobic Silica-based Films", Thin Solid Films, Jan. 24, 2005, vol. 472, No. 1-2, pp. 37-43.

Shirtcliffe, "Porous materials show superhydrophobic to superhydrophilic switching", Chemical Communications, 2005, vol. 25, pp. 3135-3137.

Sittinger, "Production of MF and DC-pulse sputtered anti-reflective/anti-static optical interference coatings using a large area in-line coater", Thin Solid Films, Apr. 2006, vol. 502, Nos. 1-2, pp. 175-180.

Song, "Synthesis of Hydrophilic Coating Solution for Polymer Substrate Using Glycidoxypropyltrimethoxysilane", Journal of Sol-Gel Science and Technology, 2003, vol. 27, pp. 53-59.

Sun, "Reversible Switching between Superhydrophilicity and Superhydrophobicity", Angewandte Chemie International Edition, Jan. 2004, vol. 43, No. 3, pp. 357-360.

Wang, "Light-Induced Amphiphilic Surfaces", Nature, Jul. 31, 1997, vol. 388, No. 6641, pp. 431-432.

Wouters, "Transparent UV curable antistatic hybrid coatings on polycarbonate prepared by the sol-gel method", Progress in Organic Coatings, Dec. 2004, vol. 51, No. 4, pp. 312-320.

Wu, "Structural Color in Porous, Superhydrophilic, and Self-cleaning $SiO_2/TiO_2$ Bragg Stacks", Small, Aug. 3, 2007, vol. 3, No. 8, pp. 1445-1451.

Yoon, "Specific Targeting, Cell Sorting, and Bioimaging with Smart Magnetic Silica Core-Shell Nanomaterials", Small, Feb. 2006, vol. 2, No. 2, pp. 209-215.

Yu, "Preparation and characterization of super-hydrophilic porous $TiO_2$ coating films", Materials Chemistry and Physics, Feb. 2001, vol. 68, Nos. 1-3, pp. 253-259.

Zhang, "Catalytic Effect of Aluminum Acetylacetonate on Hydrolysis and Polymerization of Methyltrimethoxysilane", Langmuir, Feb. 5, 1997, vol. 13, No. 3, pp. 473-476.

"Ion Exchange", Remco Engineering, Ventura, CA, USA [online], Ion Exchange Chemistry and Operation, [retrieved from the internet on Jul. 1, 2010], URL <http://www.remco.com/ix.htm>, 9 pages.

"SNOWTEX®", Nissan Chemical America Corporation, Houston, TX, USA [online], 2007, [retrieved from the internet on Jul. 1, 2010], URL <http://www.nissanchem-usa.com/snowtex.php>, 8 pages.

International Search Report for PCT/US2010/040524, 5 pages.

\* cited by examiner

HYDROPHILIC COATINGS, ARTICLES, COATING COMPOSITIONS, AND METHODS

STATEMENT OF PRIORITY

This application is a divisional filing of U.S. application Ser. No. 13/378,182, filed Dec. 14, 2011, which is a national stage filing under 35 U.S.C. 371 of PCT/US2010/040524, filed Jun. 30, 2010, which claims priority to China Application No. 200910151003.4, filed Jul. 3, 2009 and U.S. Provisional Application No. 61/236,672, filed Aug. 25, 2009, the disclosure of which is incorporated by reference in its/their entirety herein.

BACKGROUND

Articles having surfaces capable of spreading water, and thus preventing the formation of water droplets on the surface of the article, are desirable for a variety of uses. In general, fog formation occurs under conditions of high humidity and high temperature or at interfacial boundaries where there is a large temperature and humidity difference.

For example, transparent plastics used in misty or humid environments, such as windows of greenhouses, should avoid the formation of light-reflecting water droplets or fog which reduce light transmission. Also, solar panels, protective eyewear (goggles, face shields, helmets, etc.), ophthalmic lenses, architectural glazings, decorative glass frames, motor vehicle windows and windshields may be detrimentally affected by the formation of a moisture vapor fog on a surface of the article.

A water-spreading surface provided by a hydrophilic coating on these materials helps to maintain their transparency and minimizes undesirable streaking. Hydrophilic coatings which reportedly reduce the tendency for surfaces to "fog up" (i.e., antifogging coatings) are known, including those that incorporate surfactants. A need still exists for a coating composition that will impart hydrophilicity to a substrate surface, wherein such hydrophilic surfaces demonstrate improvement, relative to an uncoated substrate, in at least one of antifogging, antireflective, easy-cleaning, and antistatic properties to a substrate coated therewith.

SUMMARY

The invention relates to an aqueous-based coating composition that imparts at least one of antifogging characteristics, antireflective characteristics, easy-cleaning characteristics, and antistatic characteristics to substrates coated therewith, as well as methods of coating and coated articles. The coating compositions utilize nanoparticles (preferably silica nanoparticles) functionalized with amine groups, protected amine groups, or combinations thereof, as well as amine-reactive groups (e.g., epoxy groups, alpha,beta-unsaturated groups). Preferably, the amine and/or protected amine groups are covalently bonded to one portion or set of nanoparticles and the amine-reactive groups are covalently bonded to a different portion or set of nanoparticles. More preferably, coating compositions of the present invention utilize a mixture that includes a portion or set of nanoparticles (preferably silica nanoparticles) functionalized with amine groups and a second portion or set of nanoparticles functionalized with epoxy groups. The coating compositions are particularly useful on solar panels and on a wide variety of personal protection equipment such as face masks, shields, and protective glasses.

In one embodiment, the present invention provides a method of modifying a substrate surface. The method includes: applying a coating composition to a substrate; and drying the coating composition to form a hydrophilic coating on the substrate; wherein the coated substrate demonstrates improvement, relative to the uncoated substrate, in at least one characteristic selected from the group consisting of antifogging, antireflective, easy-cleaning, and antistatic characteristics. The coating composition includes: nanoparticles comprising functional groups attached to their surface through covalent bonds, wherein the functional groups comprise: amine groups, protected amine groups, or combinations thereof; amine-reactive groups; and optional hydrophilic groups (preferably, the amine and/or protected amine groups are covalently bonded to one portion of nanoparticles and the amine-reactive groups are covalently bonded to a different portion of nanoparticles); an optional surfactant; and a liquid medium comprising water and no greater than 30 wt-% organic solvent, if present, based on the total weight of liquid medium. In certain preferred embodiments, the coating composition includes: a portion of the nanoparticles comprising covalently bonded amine groups; and a different portion of the nanoparticles comprising covalently bonded epoxy groups.

In one embodiment, the present invention provides a coating composition. The coating composition includes: nanoparticles; an optional surfactant; and a liquid medium comprising water and no greater than 30 wt-% organic solvent, if present, based on the total weight of liquid medium; wherein the coating composition provides a hydrophilic coating to a substrate on which it is coated and dried, having an improvement, relative to an uncoated substrate, in at least one characteristic selected from the group consisting of antifogging, antireflective, easy-cleaning, and antistatic characteristics. The nanoparticles include functional groups attached to the surface through covalent bonds, wherein the functional groups comprise: amine groups, protected amine groups, or combinations thereof; amine-reactive groups; and optional hydrophilic groups. In certain preferred embodiments, the coating composition includes: a portion of the nanoparticles comprising covalently bonded amine groups; and a different portion of the nanoparticles comprising covalently bonded amine-reactive groups.

In one embodiment, the present invention provides a kit for modifying a substrate surface. The kit includes: at least one container comprising a first composition comprising: nanoparticles comprising functional groups attached to the surface through covalent bonds, wherein the functional groups comprise: amine groups, protected amine groups, or combinations thereof; optional hydrophilic groups; an optional surfactant; and water (preferably, a liquid medium comprising water and no greater than 30 wt-% organic solvent, if present, based on the total weight of liquid medium); and at least one container comprising a second composition comprising: nanoparticles comprising functional groups attached to the surface through covalent bonds, wherein the functional groups comprise: amine-reactive groups; optional hydrophilic groups; an optional surfactant; and water (preferably, a liquid medium comprising water and no greater than 30 wt-% organic solvent, if present, based on the total weight of liquid medium); wherein the coating compositions when combined, applied to a substrate, and dried, provide a hydrophilic coating on the substrate that demonstrates improvement, relative to an uncoated substrate, in at least one characteristic selected from the group consisting of antifogging, antireflective, easy-cleaning, and antistatic characteristics.

In one embodiment, the present invention provides an article comprising a substrate having at least a portion of at least one surface coated with a hydrophilic coating, wherein the hydrophilic coating comprises a dendritic network comprising one or more types of nanoparticles interconnected through covalent chemical bonds formed by the reaction of functional groups covalently bonded to said nanoparticles, wherein the functional groups comprise amine groups, protected amine groups, or combinations thereof, and amine-reactive groups (preferably, the amine and/or protected amine groups are covalently bonded to one portion of nanoparticles and the amine-reactive groups are covalently bonded to another different portion of nanoparticles prior to reaction); wherein the coated substrate demonstrates improvement, relative to the uncoated substrate, in at least one characteristic selected from the group consisting of antifogging, antireflective, easy-cleaning, and antistatic characteristics. In certain embodiments, the article is a personal protection article. In certain embodiments, the article is a solar panel.

In one embodiment, the present invention provides a method of functionalizing an aqueous dispersion of silica nanoparticles with amino groups. The method includes: adjusting the pH of an aqueous dispersion of silica nanoparticles to at least 10.5 to form negatively charged silica nanoparticles; combining the negatively charged silica nanoparticles with an alkoxy aminoalkyl-substituted organosilane compound comprising an alkoxysilyl end; allowing the alkoxy aminoalkyl-substituted organosilane compound to react with the negatively charged silica nanoparticles for a time effective to cause the alkoxysilyl end of the alkoxy aminoalkyl-substituted organosilane compound to preferentially react with the negatively charged silica surface.

Herein, preferably the nanoparticles comprise silica nanoparticles. Preferably, the nanoparticles have an average particle size of no greater than 60 nm.

In certain embodiments, hydrophilicity can be enhanced if at least a portion of the nanoparticles comprise those bearing covalently bonded hydrophilic groups. Such hydrophilic groups can be selected from the group consisting of carboxylate groups, structural units bearing multiple carboxylate groups, sulfate half-ester groups, structural units bearing multiple sulfate half-ester groups, sulfonate groups, structural units bearing multiple sufonate groups, phosphate mono- and/or diester groups, structural units bearing multiple phosphate mono and/or diester groups, phosphonate groups, structural units bearing multiple phosphonate groups, acids thereof, and combinations thereof. Alternatively, or additionally, such hydrophilic groups can be selected from the group consisting of quaternary ammonium groups, quaternary phosphonium groups, tertiary sulfonium groups, hydroxyl groups, polyethylene oxide groups, combinations thereof and structural units bearing multiples thereof. In certain embodiments, the hydrophilic groups are charged.

Definitions

"Nanoparticles" are herein defined as nanometer-sized particles, preferably with an average particle size of no greater than 60 nanometers (nm). As used herein, "particle size" and "particle diameter" have the same meaning and are used to refer to the largest dimension of a particle (or agglomerate thereof). In this context, "agglomeration" refers to a weak association between particles which may be held together by charge or polarity and can be broken down into smaller entities.

"Amine-reactive groups" covalently bonded to the nanoparticles are functional groups capable of forming a covalent bond with an amine group under conditions appropriate for drying of an aqueous coating.

"Hydrophilic groups" include water-dispersible groups, water-soluble groups, and/or charged groups that provide hydrophilicity to the surface of the nanoparticles. Preferably, if such groups are attached to nanoparticles, they are capable of reducing, and preferably preventing, excessive agglomeration and precipitation of nanoparticles in water, and are referred to as "water-dispersible groups."

"Charged groups" refer to groups that have one or more than one ionizable group per functional group.

"Hydrophilic coating" means that the surface of the coating has a static contact angle of less than 60°. "Highly hydrophilic coating" means that the surface of the coating has a static contact angle of less than 30°. Preferably, a superhydrophilic coating demonstrates a "water-like" surface capable of spreading the deposition of fine water droplets into a continuous film and the surface of the coating has a contact angle less than 10°.

"Tempered glass" means glass that has been subjected to a toughening process that includes heating at an elevated temperature such as a temperature equal to at least 500° C., at least 600° C., or at least 700° C. for a time up to 30 minutes, up to 20 minutes, up to 10 minutes, or up to 5 minutes and then cooling its surface rapidly. For example, the glass can be heated at a temperature in the range of 700° C. to 750° C. for about 2 to 5 minutes followed by rapid cooling.

A "dried" coating is a coating that has been applied from a coating composition that includes a liquid carrier (i.e., fluid or liquid media), and the liquid carrier has been substantially completely removed, for example, by evaporation. A dried coating is typically also "cured" as a result of reaction between the reactive functional groups (e.g., amine groups and epoxy groups) during the solvent evaporation. The rate and degree of curing can be enhanced by heating the coating composition during the drying process.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a nanoparticle that comprises "a" functional group can be interpreted to mean that the nanoparticle includes "one or more" functional groups.

The term "and/or" means one or all of the listed elements/characteristics or a combination of any two or more of the listed elements/characteristics.

As used herein, the term "or" is generally employed in its usual sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
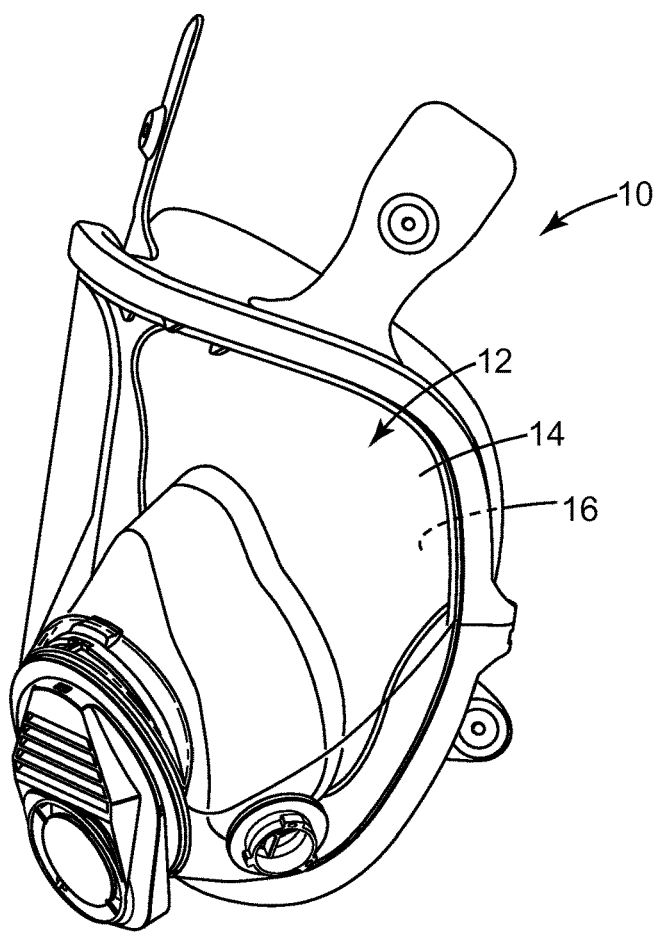
FIG. 1 illustrates a respirator comprising a face shield that includes a transparent substrate with a coating of the present invention thereon.

The invention relates to aqueous-based coating compositions containing functionalized nanoparticles, particularly silica nanoparticles, as well as methods of coating and coated articles. The nanoparticles are functionalized with amine groups, protected amine groups, or combinations thereof, as well as amine-reactive groups, and optionally hydrophilic groups (which are water-like functionalities and may be water-dispersible, water-soluble, and/or charged groups). Preferably, the amine and/or protected amine groups are covalently bonded to one portion (i.e., set) of the population of nanoparticles and the amine-reactive groups are covalently bonded to another different portion (i.e., set) of the population of nanoparticles. In certain preferred embodiments, a portion of the nanoparticles are functionalized with amine groups, protected amine groups, or combinations thereof (preferably, with amine groups), and a portion of the nanoparticles are functionalized with epoxy groups.

It should be understood that although a certain portion of the population of nanoparticles can be bare particles upon applying the coating composition to a substrate, a large portion, and preferably a majority, of the nanoparticles have reactive functionalities (e.g., amine and epoxy groups) covalently bonded thereto. Also, typically coating compositions of the present invention are formed after the nanoparticles are functionalized with the amine and/or protected amine groups and the amine-reactive groups.

Coating compositions of the present invention impart at least one of antifogging characteristics, antireflective characteristics, easy-cleaning characteristics, and antistatic characteristics to substrates coated therewith. One or more of these properties results from the design of nanoparticle surface-chemistries that enable assembling/interconnecting these nanoparticles together through covalently chemical bonds, thereby forming a dendritic structure, which contributes to the formation of hydrophilic coatings with one or more of such desired properties.

Coatings of the present invention are hydrophilic, which means that the surface of the coating has a static contact angle of less than 60°. Preferred coatings of the present invention are highly hydrophilic, which means that the surface of the coating has a static contact angle of less than 30°. More preferred coatings of the present invention are superhydrophilic, which means that the coating demonstrates a "water-like" surface capable of spreading the deposition of fine water droplets into a continuous film and the surface of the coating has a contact angle less than 10°.

Certain coating compositions of the present invention provide antifog properties to substrates coated and dried thereon. Dried coatings are considered "antifogging" if a coated substrate resists the formation of small, condensed water droplets in sufficient density to significantly reduce the transparency of the coated substrate such that it cannot be adequately seen through, after exposure to repeated human breathing directly on the article and/or after holding the article above a "steam" jet and/or after exposure to water vapor residing above a container of water kept at 15° C. to 20° C. A coating composition may still be regarded as antifogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a "steam" jet.

Certain coating compositions of the present invention provide "antireflective" properties to substrates coated and dried thereon, which can be defined as follows. When the coating compositions of the invention are applied to substrates to provide antireflection or reduced reflection properties, glare is reduced by increasing the light transmission of the coated substrate. Preferably, a single-sided coated substrate such as a glass substrate exhibits an increase in transmission of normal incident light of at least 0.5 percentage points, at least 3 percentage points, and up to as much as 10 percentage points or more with a double-sided coated substrates, when compared to an uncoated substrate, at 550 mm (e.g., the wavelength at which the human eye displays peak photo-optic response). The percent transmission is dependent upon the angle of incidence and the wavelength of light and is determined, for example, for plastics, using ASTM test method D1003-92, entitled "Haze and Luminous Transmittance of Transparent Plastics." Preferably, single-sided coated glass substrates display an increase in percent transmission of at least 0.5 percent, and more preferably least 3 percent, when compared with an uncoated substrate, using 550 nm light. Preferably, single-sided coated plastic substrates display an increase in percent transmission of at least 3 percent, more preferably at least 5 percent, and most preferably greater than 8 percent with double sided coated substrates, when compared with an uncoated substrate, using 550 nm light. For double-sided coated substrates the increase in percent transmission is typically twice these values. When the desired usage involves significant "off-axis" (i.e., non-normal) viewing or unwanted reflections, gains in visibility may be greater especially where the reflections approach or exceed in brightness the object in view.

Antireflection properties are considered over an even broader range than 550 nm when considering solar cells. Solar cells have been developed with a variety of semiconductor materials that have unique absorption spectra for converting solar energy into electricity. Each type of semiconductor material will have a characteristic band gap energy which causes it to absorb light most efficiently at certain wavelengths of light, or more precisely, to absorb electromagnetic radiation over a portion of the solar spectrum. Examples of semiconductor materials used to make solar cells and their solar light absorption band-edge wavelengths include, but are not limited to: crystalline silicon single junction (about 400 nm to about 1150 nm), amorphous silicon single junction (about 300 nm to about 720 nm), ribbon silicon (about 350 nm to about 1150 nm), CIGS (Copper Indium Gallium Selenide, about 350 nm to about 1000 nm), CdTe (Cadmium Telluride, about 400 nm to about 895 nm), GaAs multi junction (about 350 nm to about 1750 nm). The shorter wavelength left absorption band edge of these semiconductor materials is typically between 300 nm and 400 nm. One skilled in the art understands that new materials are being developed for more efficient solar cells having their own unique longer wavelength absorption band-edge and the multi-layer reflective film would have a corresponding reflective band-edge.

In certain embodiments, the resultant coatings demonstrate improved light transmission relative to the uncoated surfaces as a result of a reduction on coating surfaces of unwanted reflection and glare. It is believed that this results because the coatings are highly porous (i.e., nanoporous) as a result of the presence of voids between the nanoparticles created upon bonding between nanoparticles and packing. It is further believed that the pore sizes are much smaller than that of visible light wavelength as light scattering is typically not observed.

Certain coating compositions of the present invention provide easy-cleaning properties to substrates coated and dried thereon. Dried coatings are considered "cleanable" or "easily cleaned" or possessing "cleanable" or "easy-cleaning" characteristics if a coated substrate exhibits oil and/or soil resistance. Alternatively and/or additionally, dried coatings are considered easy-cleaning or cleanable if organic contaminates, such as soil, food, machine oils, paints, dust, and/or dirt, may be simply rinsed away by water. Such easy-cleaning or cleanable characteristics typically result because the nanoporous structure of the coatings tends to prevent penetration by oligomeric and polymeric molecules.

Certain coating compositions of the present invention provide antistatic properties to substrates coated and dried thereon. Dried coatings are considered "antistatic" if a coated substrate has an electrical resistance of $10^{12}$ Ω/sq to $10^5$ Ω/sq, as determined using a Hiresta HT260 (OAI, San Jose, Calif., U.S.A) instrument with a setting of 100V for 10 second charge time at 25° C. Certain applications may even require the surface resistivity to be in the order of $10^9$ Ω/sq to $10^5$ Ω/sq.

Coating compositions of the present invention, when applied to a substrate (e.g., of inorganic or organic material) and dried, are generally durable such that handling during normal use (e.g., touching) does not completely remove the dried coating. Preferred coatings are durable such that the dried coating is not completely removed under more mechanically harsh (e.g., rubbing) conditions, as demonstrated in the Examples Section.

Preferred dried coatings prepared from coating compositions of the present invention can be sufficiently durable that they can provide one or more desirable properties (antifog, antireflective, easy-cleaning, and/or antistatic characteristics) for at least 12 hours, more preferably for at least 24 hours, even more preferably at least 120 hours, and often as long as 200 or more hours under 50° C. and 90% humidity conditions.

Coating compositions of the present invention can be temporary (e.g., removable), or permanent. For example, a "removable" dried coating is one that can be removed from a surface (preferably, completely removed without any residue remaining) by wiping the surface with a wet or dry cloth or paper towel using light hand pressure, or by rinsing with water.

It is believe that a substantial amount of biomolecules (e.g., proteins, peptides, nucleic acids) in coating compositions of the present invention adversely impact the coating network formed, including chemical bond formation and packing between particles, potentially causing poor coating durability. As a result, a substantial amount of biomolecules would adversely impact at least one of antifogging characteristics, antireflective characteristics, easy-cleaning characteristics, and antistatic characteristics. Thus, coating compositions of the present invention include substantially no biomolecules (other than perhaps due to minor atmospheric contamination).

In preferred embodiments, a portion of the nanoparticles used in the coating compositions of the present invention are functionalized with amine groups, protected amine groups, or combinations thereof. Herein, "amine" does not include quaternary ammonium. Preferably, the amine groups are primary or secondary (i.e., nontertiary), and more preferably, they are primary amines. They may be aliphatic or aromatic.

In preferred embodiments, a portion of the nanoparticles used in the coating compositions of the present invention are functionalized with amine-reactive groups. Exemplary amine-reactive groups include alpha,beta-ethylenically or acetylenically unsaturated groups with electron withdrawing groups, epoxy groups, carboxylic acid-containing groups, anhydride groups, ester-containing groups, fluorosulfonyl groups, and the like. Preferred amine-reactive groups include epoxy groups and alpha,beta-ethylenically or acetylenically unsaturated groups with electron withdrawing groups. More preferred amine-reactive groups include epoxy groups.

Preferred compositions of the present invention can have a relatively long shelf-life, preferably up to several months even when stored in liquid form, or impregnated in an applicator substrate in a sealed container, under ambient conditions (e.g., at Room Temperature). Preferred compositions are maintained at a pH of 3 to 8, or at a pH of 4 to 8, or at a pH of 5 to 8. If the coating compositions are too basic, the amine functional groups can be too reactive. If the coating compositions are too acidic, amine-reactive groups such as epoxy groups can be consumed.

Compositions that include at least two portions of particles, one portion with amine- and/or protected amine-functionalization and one portion with amine-reactive functionalities, are particularly preferred at least because of enhanced shelf-life of such mixtures. If desired, coating compositions of the present invention can be stored in at least two parts, and combined shortly before application to a surface. For example, the present invention can provide a kit for modifying a substrate surface that includes: at least one container comprising a first composition comprising: water and nanoparticles comprising functional groups attached to the surface through covalent bonds, wherein the functional groups comprise amine groups, protected amine groups, or combinations thereof; and at least one container comprising a second composition comprising: water and nanoparticles comprising functional groups attached to the surface through covalent bonds, wherein the functional groups comprise amine-reactive groups.

Nanoparticles

Nanoparticles that are surface modified in accordance with the present invention comprise nanometer-sized particles. The term "nanometer-sized" refers to particles that are characterized by an average particle size (i.e., the average of the largest dimension of the particles, or the average particle diameter for spherical particles) in the nanometer range, often no greater than 100 nanometers (nm), and preferably no greater than 60 nm (prior to surface modification, i.e., functionalization). More preferably, the average particle size is no greater than 45 nm (prior to surface modification), even more preferably no greater than 20 nm (prior to surface modification), even more preferably no greater than 10 nm (prior to surface modification), and even more preferably no greater than 5 nm (prior to surface modification). Preferably, prior to surface modification, the average particle size of the silica nanoparticles is at least 1 nm, more preferably at least 2 nm, even more preferably at least 3 nm, and even more preferably at least 4 nm, and even more preferably at least 5 nm. A particularly preferred particle size is 4 nm to 5 nm.

Average particle size of the nanoparticles can be measured using transmission electron microscopy. In the practice of the present invention, particle size may be determined using any suitable technique. Preferably, particle size refers to the number average particle size and is measured using an instrument that uses transmission electron microscopy or scanning electron microscopy. Another method to measure particle size is dynamic light scattering that measures weight average particle size. One example of such an instrument found to be suitable is the N4 PLUS SUB-MICRON PARTICLE ANALYZER available from Beckman Coulter Inc. of Fullerton, Calif.

It is also preferable that the nanoparticles be relatively uniform in size. Uniformly sized nanoparticles generally provide more reproducible results. Preferably, variability in the size of the nanoparticles is less than 25% of the mean particle size.

Herein, nanoparticles (prior to functionalization) are water-dispersible to reduce, and preferably prevent, excessive agglomeration and precipitation of the particles in an aqueous environment. If necessary, water-dispersibility can be enhanced by functionalizing the nanoparticles with water-dispersible groups. Nanoparticle aggregation can result in undesirable precipitation, gellation, or a dramatic increase in viscosity; however, small amounts of agglomeration can be tolerated when the nanoparticles are in an aqueous environment as long as the average size of the agglomerates (i.e., agglomerated particles) is no greater than 60 nm. Thus, the nanoparticles are preferably referred to herein as colloidal nanoparticles since they can be individual particles or small agglomerates thereof.

The nanoparticles preferably have a surface area of at least 10 $m^2$/gram, more preferably at least 20 $m^2$/gram, and even more preferably at least 25 $m^2$/gram. The nanoparticles preferably have a surface area of greater than 750 $m^2$/gram.

Nanoparticles of the present invention can be porous or nonporous.

The nanoparticles can be made of inorganic or organic materials. Suitable polymeric solid support materials include, but are not limited to, polyolefins, polystyrenes, polyacrylates, polymethacrylates, polyacrylonitriles, poly(vinylacetates), polyvinyl alcohols, polyvinyl chlorides, polyoxymethylenes, polycarbonates, polyamides, polyimides, polyurethanes, phenolics, polyamines, amino-epoxy resins, polyesters, silicones, cellulose based polymers, polysaccharides, or combinations thereof. In some embodiments, the polymeric material is a copolymer prepared using a comonomer having a complementary group capable of reacting with a surface-bonding group A of a molecule containing a desired functional group (e.g., amine group, epoxy group). For example, the comonomer can contain a carboxy, mercapto, hydroxy, amino, or alkoxysilyl group. These groups are able to react with surface-bonding groups A.

Suitable glass and ceramic nanopartices can include, for example, sodium, silicon, aluminum, lead, boron, phosphorous, zirconium, magnesium, calcium, arsenic, gallium, titanium, copper, or combinations thereof. Glasses typically include various types of silicate-containing materials.

An organic polymeric nanoparticle can be coated with an inorganic layer, such as a thin layer of $SiO_2$. Such materials can be created by the known methods, such as vapor deposition or sol-gel chemistry.

Alternatively, the nanoparticles can include a layer of diamond-like glass. The diamond-like glass is an amorphous material that includes carbon, silicon, and one or more elements selected from hydrogen, oxygen, fluorine, sulfur, titanium, or copper. Some diamond-like glass materials are formed from a tetramethylsilane precursor using a plasma process. A hydrophobic material can be produced that is further treated in an oxygen plasma to control the silanol concentration on the surface.

Diamond-like glass can be in the form of a thin film or coating on another material in the nanoparticles. In some applications, the diamond-like glass can be in the form of a thin film having at least 30 weight percent (wt-%) carbon, at least 25 wt-% silicon, and up to 45 wt-% oxygen. The surface-bonding group A is attached to the surface of the diamond-like glass.

In some multilayer nanoparticles, the diamond-like glass is deposited on a layer of diamond-like carbon. For example, the second layer is a polymeric film having a layer of diamond-like carbon deposited on a surface. A layer of diamond-like glass is deposited over the diamond-like carbon layer. The diamond-like carbon can, in some embodiments, function as a tie layer or primer layer between a polymeric layer and a layer of diamond-like glass in multilayer nanoparticles. Diamond-like carbon films can be prepared, for example, from acetylene in a plasma reactor.

Suitable metals, metal oxides, or hydrated metal oxides for nanoparticles can include, for example, gold, silver, platinum, palladium, aluminum, copper, chromium, iron, cobalt, nickel, zinc, titanium, and the like. Herein, silicon, and other metalloids, are also included within the scope of the term "metal." The metal-containing material can include alloys such as stainless steel, indium tin oxide, and the like.

In some embodiments, a metal-containing material is the outer layer of a multilayer nanoparticle. For example, nanoparticles can have a polymeric second layer and a metal containing first layer. In one more specific example, the second layer is a polymeric film and the first layer is a thin film of gold. In other examples, multilayer nanoparticles include a polymeric film coated with a titanium-containing layer and then with a gold-containing layer. That is, the titanium layer can function as a tie layer or a primer layer for adhering the layer of gold to the polymeric layer. The polymeric layer in some examples can be a polyester or polyimide film.

In still other examples of multilayer nanoparticles that include a metal-containing material, a silicon support layer can be covered with one or more metal-containing materials. In a specific example, a silicon support layer can be covered with a layer of chromium and then with a layer of gold. The chromium layer can improve the adhesion of the gold layer to the silicon layer.

Preferably, nanoparticles of the present invention include silica. Nanoparticles can include essentially only silica (although other oxides can be used, such as $ZrO_2$, colloidal zirconia, $Al_2O_3$, colloidal alumina, $CeO_2$, colloidal ceria, $SnO_2$, colloidal tin (stannic) oxide, $TiO_2$, colloidal titanium dioxide), or they can be composite nanoparticles such as core-shell nanoparticles. A core-shell nanoparticle can include a core of an oxide (e.g., iron oxide) or metal (e.g., gold or silver) of one type and a shell of silica (or zirconia, alumina, ceria, tin oxide, or titanium dioxide) deposited on the core. Silica is the most preferred nanoparticle, particularly silica nanoparticles derived from a silicate, such as an alkali metal silicate or ammonium silicate. Herein, "silica nanoparticles" refer to nanoparticles that include only silica as well as core-shell nanoparticles with a surface that includes silica.

The unmodified nanoparticles can be provided as a sol rather than as a powder. Preferred sols generally contain from 15 wt-% to 50 wt-% of colloidal particles dispersed in a fluid medium. Representative examples of suitable fluid media for the colloidal particles include water, aqueous alcohol solutions, lower aliphatic alcohols, ethylene glycol, N,N-dimethylacetamide, formamide, or combinations thereof. The preferred fluid medium is aqueous, e.g., water and optionally one or more alcohols. When the colloidal particles are dispersed in an aqueous fluid, the particles can be stabilized due to common electrical charges that develop on the surface of each particle. The common electrical charges tend to promote dispersion rather than agglomeration or aggregation, because the similarly charged particles repel one another.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Oak Brook, Ill.). Some useful silica sols are NALCO 1115, 2326, 1050, 2327, and 2329 available as silica sols with mean particle sizes of 4 nanometers (nm) to 77 nm. Another useful silica sol is NALCO 1034a available as a silica sol with mean particle size of 20 nanometers. Another useful silica sol is NALCO 2326 available as a silica sol with mean particle size of 5 nanometers. Additional examples of suitable colloidal silicas are described in U.S. Pat. No. 5,126,394.

Suitable silica nanoparticles used in coating compositions of the present invention can be acicular. The term "acicular" refers to the general needle-like, elongated shape of the particles and may include other sting-like, rod-like, chain-like shapes, as well as filamentary shapes. The acicular colloidal silica particles may have a uniform thickness of 5 to 25 nm, a length, $D_1$, of 40 to 500 nm (as measured by dynamic light-scattering method) and a degree of elongation $D_1/D_2$ of 5 to 30, wherein $D_2$ means a diameter in nm calculated by the equation $D_2=2720/S$ and S means specific surface area in $m^2/g$ of the particle, as is disclosed in the specification of U.S. Pat. No. 5,221,497.

U.S. Pat. No. 5,221,497 discloses a method for producing acicular silica nanoparticles by adding water-soluble calcium salt, magnesium salt or mixtures thereof to an aqueous colloidal solution of active silicic acid or acidic silica sol having a mean particle diameter of 3 to 30 nm in an amount of 0.15 to 1.00 wt. % based on CaO, MgO or both to silica, then adding an alkali metal hydroxide so that the molar ratio of $SiO_2/M_2O$ (M:alkali metal atom) becomes 20 to 300, and heating the obtained liquid at 60 to 300° C. for 0.5 to 40 hours. The colloidal silica particles obtained by this method are elongate-shaped silica particles that have elongations of a uniform thickness within the range of 5 to 40 nm extending in only one plane. Acicular silica sol may also be prepared as described in U.S. Pat. No. 5,597,512.

Useful acicular silica particles may be obtained as an aqueous suspension under the trade name SNOWTEX-UP by Nissan Chemical Industries (Tokyo, Japan). The mixture consists of 20-21% (w/w) of acicular silica, less than 0.35% (w/w) of $Na_2O$, and water. The particles are 9 to 15 nanometers in diameter and have lengths of 40 to 300 nanometers. The suspension has a viscosity of less than 100 mPas at 25° C., a pH of 9 to 10.5, and a specific gravity of 1.13 at 20° C.

Other useful acicular silica particles may be obtained as an aqueous suspension under the trade name SNOWTEX-PS-S and SNOWTEX-PS-M by Nissan Chemical Industries, having a morphology of a string of pearls comprised of nanoparticles. The mixture consists of 20-21% (w/w) of silica, less than 0.2% (w/w) of $Na_2O$, and water. The SNOWTEX-PS-M particles are 18 to 25 nanometers in diameter and have lengths of 80 to 150 nanometers. The particle size is 80 to 150 nanometers by dynamic light scattering methods. The suspension has a viscosity of less than 100 mPas at 25° C., a pH of 9 to 10.5, and a specific gravity of 1.13 at 20° C. The SNOWTEX-PS-S has a particle diameter of 10-15 nm and a length of 80-120 nm.

The sols used in the present invention generally can include counter cations, in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR_4^+$, wherein each R can be any monovalent moiety, but is preferably H or lower alkyl, such as —$CH_3$, combinations of these, and the like.

A variety of methods are available for modifying the surfaces of nanoparticles, depending on the functionality of the surface. Of the suggested reaction below, it is understood that when working in aqueous media there is a strong preference for groups stable or metastable in water.

The surface of the nanoparticles typically includes a group capable of reacting combinatively with a carboxy, halocarbonyl, halocarbonyloxy, cyano, hydroxy, fluorosulfonyl, isocyanato, halosilyl, alkoxysilyl, acyloxysilyl, azido, aziridinyl, haloalkyl, primary aliphatic amino, secondary aliphatic amino, mercapto, disulfide, alkyl disulfide, benzotriazolyl, phosphonato, phosphoroamido, phosphato, or ethylenically unsaturated group. That is, the nanoparticles (prior to functionalization) typically include a group capable of reacting with the surface-bonding group A (i.e., the nanoparticles include a group complementary to, i.e., reactive with, the group A). Nanoparticles can be treated to form an outer layer that includes a complementary group (i.e., surface reactive group). The nanoparticles can be prepared from any solid phase material known to have groups capable of reacting with surface-bonding group A and is not limited to the following examples of suitable materials.

A carboxy or phosphonic or phosphoric group can react with a nanoparticle containing a metal or metal oxide, in particular, wherein the metal is copper, iron, nickel, or aluminum.

A carboxy group or a halocarbonyl group can react with a nanoparticle having a hydroxy group to form a carbonyloxy-containing attachment group. Examples of nanoparticle materials having hydroxy groups include, but are not limited to, polyvinyl alcohol, hydroxy substituted esters of polymethacrylates, hydroxy substituted esters of polyacrylates, corona-treated polyethylene, and a polyvinyl alcohol coating on a support material such as glass or polymeric film.

A carboxy group or a halocarbonyl group can also react with a nanoparticle having a mercapto group to form a carbonylthio-containing attachment group. Examples of nanoparticle materials having a mercapto group include, but are not limited to, mercapto substituted esters of polyacrylates, mercapto substituted esters of polymethacrylates, and glass treated with a mercaptoalkylsilane.

Additionally, a carboxy group or a halocarbonyl group can react with a primary aliphatic amino group or a secondary aliphatic amino group to form a carbonylimino-containing attachment group. Examples of nanoparticle materials having aromatic primary or secondary amino groups include, but are not limited to, polyamines, amine substituted esters of polymethacrylate, amine substituted esters of polyacrylate, polyethylenimines, and glass treated with an aminoalkylsilane.

A halocarbonyloxy group can react with a nanoparticle having a hydroxy group to form an oxycarbonyloxy-containing attachment group. Examples of nanoparticle materials having hydroxy groups include, but are not limited to, polyvinyl alcohol, corona-treated polyethylene, hydroxy substituted esters of polymethacrylates, hydroxy substituted esters of polyacrylates, and a polyvinyl alcohol coating on a support material such as glass or a polymeric film.

A halocarbonyloxy group can also react with a nanoparticle having a mercapto group to form an oxycarbonylthio-containing attachment group. Examples of nanoparticle materials having a mercapto group include, but are not limited to, mercapto substituted esters of polymethacrylates, mercapto substituted esters of polyacrylates, and glass treated with a mercaptoalkylsilane.

A cyano group can react with a nanoparticle having an azido group to form a tetrazinediyl-containing attachment group. Examples of nanoparticles having azido groups include, but are not limited to, a coating of poly(4-azidomethylstyrene) on a glass or polymeric support. Suitable polymeric support materials include polyesters, polyimides, and the like.

A hydroxyl group can react with a nanoparticle having isocyanate group to form an oxycarbonylimino-containing attachment group. Suitable nanoparticles having isocyanate groups include, but are not limited to, a coating of 2-isocyanatoethylmethacrylate polymer on a support material. Suitable support materials include glass and polymeric materials such as polyesters, polyimides, and the like.

A hydroxyl group can react with a nanoparticle having a carboxy, carbonyloxycarbonyl, or halocarbonyl to form a carbonyloxy-containing attachment group. Suitable nanoparticles include, but are not limited to, a coating of acrylic acid polymer or copolymer on a support material or a coating of a methacrylic acid polymer or copolymer on a support material. Suitable support materials include glass and polymeric materials such as polyesters, polyimides, and the like. Other suitable nanoparticles include copolymers of polyethylene with polyacrylic acid, polymethacrylic acid, or combinations thereof.

A mercapto group can react with a nanoparticle having isocyanate groups. The reaction between a mercapto group and an isocyanate group forms a thiocarbonylimino-containing attachment group. Suitable nanoparticles having isocyanate groups include, but are not limited to, a coating of 2-isocyanatoethylmethacrylate polymer on a support material. Suitable support materials include glass and polymeric materials such as polyesters, polyimides, and the like.

A mercapto group can also react with a nanoparticle having a halocarbonyl group to form a carbonylthio-containing attachment group. Nanoparticles having halocarbonyl groups include, for example, chlorocarbonyl substituted polyethylene.

A mercapto group can also react with a nanoparticle having a halocarbonyloxy group to form an oxycarbonylthio-containing attachment group. Nanoparticles having halocarbonyl groups include chloroformyl esters of polyvinyl alcohol.

Additionally, a mercapto group can react with a nanoparticle having an ethylenically unsaturated group to form a thioether-containing attachment group. Suitable nanoparticles having an ethylenically unsaturated group include, but are not limited to, polymers and copolymers derived from butadiene.

An isocyanato group can react with a nanoparticle having a hydroxy group to form a oxycarbonylimino-containing attachment group. Examples of nanoparticle materials having hydroxy groups include, but are not limited to, polyvinyl alcohol, corona-treated polyethylene, hydroxy substituted esters of polymethacrylates or polyacrylates, and a polyvinyl alcohol coating on glass or polymeric film.

An isocyanate group can also react with a mercapto group to form a thiocarbonylimino-containing attachment group. Examples of nanoparticle materials having a mercapto group include, but are not limited to, mercapto substituted esters of polymethacrylates or polyacrylates and glass treated with a mercaptoalkylsilane.

Additionally, an isocyanate group can react with a primary aliphatic amino group or a secondary aliphatic amino group to form an iminocarbonylimino-containing attachment group. Suitable nanoparticles having primary or secondary amino groups include, but are not limited to, polyamines, polyethylenimines, and coatings of an aminoalkylsilane on a support material such as glass or on a polymeric material such as a polyester or polyimide.

An isocyanate group can also react with a carboxy to form an O-acyl carbamoyl-containing attachment group. Suitable nanoparticles having a carboxylic acid group include, but are not limited to, a coating of an acrylic acid polymer or copolymer or a coating of a methacrylic acid polymer or copolymer on a glass or polymeric support. Copolymers include, but are not limited to, copolymers that contain polyethylene and polyacrylic acid or polymethacrylic acid. Suitable polymeric support materials include polyesters, polyimides, and the like.

A halosilyl group, an alkoxysilyl group, or an acyloxysilyl group can react with a nanoparticle having a silanol group to form a disiloxane-containing attachment group. Suitable nanoparticles include those prepared from various glasses, ceramic materials, or polymeric material. These groups can also react with various materials having metal hydroxide groups on the surface to form a siloxane-containing attachment group. Suitable metals include, but are not limited to, silver, aluminum, copper, chromium, iron, cobalt, nickel, zinc, and the like. In some embodiments, the metal is stainless steel or another alloy. Polymeric material can be prepared to have silanol groups. For example, commercially available monomers with silanol groups include 3-(trimethoxysilyl) propylmethacrylate and 3-aminopropyltrimethoxy silane from Aldrich Chemical Co., Milwaukee, Wis.

A haloalkyl group can react, for example, with a nanoparticle having a tertiary amino group to form a quaternary ammonium-containing attachment group. Suitable nanoparticles having a tertiary amino group include, but are not limited to, polydimethylaminostyrene or polydimethylaminoethylmethacrylate.

Likewise, a tertiary amino group can react, for example, with a nanoparticle having a haloalkyl group to form a quaternary ammonium-containing attachment group. Suitable nanoparticles having a haloalkyl group include, for example, coatings of a haloalkylsilane on a support material. Support materials can include, but are not limited to, glass and polymeric materials such as polyesters and polyimides.

A primary aliphatic amino or a secondary aliphatic amino group can react, for example, with a nanoparticle having isocyanate group to form an oxycarbonylimino-containing attachment group. Suitable nanoparticles having isocyanate groups include, but are not limited to, a coating of a 2-isocyanatoethylmethacrylate polymer or copolymer on a glass or polymeric support. Suitable polymeric supports include polyesters, polyimides, and the like.

A primary aliphatic amino or a secondary aliphatic amino group can also react with a nanoparticle containing a carboxy or halocarbonyl group to form a carbonylimino-containing attachment group. Suitable nanoparticles include, but are not limited to, acrylic or methacrylic acid polymeric coatings on a support material. The support material can be, for example, glass or a polymeric material such as polyesters or polyimides. Other suitable nanoparticles include copolymers of polyethylene and polymethacrylic acid or polyacrylic acid.

A disulfide, a thiol, or an alkyl disulfide group can react, for example, with a surface containing a metal or metal oxide. Suitable metals or metal oxides include, but are not limited to, gold, silver, platinum, palladium, nickel, copper, and chromium. The nanoparticle can also be an alloy such as indium tin oxide or a dielectric material.

A benzotriazolyl can react, for example, with a nanoparticle having a metal or metal oxide surface. Suitable metals or metal oxides include, for example, silver, aluminum, copper, chromium, iron, cobalt, nickel, zinc, and the like. The metals or metal oxides can include alloys such as stainless steel, indium tin oxide, and the like.

A phosphonato, phosphoroamido, or phosphato can react, for example, with a nanoparticle having a metal or metal oxide surface. Suitable metals or metal oxides include, for example, silver, aluminum, copper, chromium, iron, cobalt, nickel, zinc, and the like. The metals or metal oxides can include alloys such as stainless steel, indium tin oxide, and the like.

An ethylenically unsaturated group can react, for example, with a nanoparticle having a mercapto group. The reaction forms a heteroalkylene-containing attachment group. Suitable nanoparticles include, for example, mercapto-substituted alkyl esters of polyacrylates or polymethacrylates.

The above described anchoring groups are useful for creating the covalent attachment of the corresponding epoxy or amine functionalities or Michael addition donors or acceptors on the nanoparticles Various mixtures of different types of nanoparticles can be used if desired (even including "bare" or "naked", i.e., nonfunctionalized, nanoparticles or nanoparticles functionalized with only hydrophilic groups). The nanoparticle concentration in coating compositions of the present invention is preferably at least 0.1 percent by weight (wt-%), more preferably at least 0.2 wt-%, even more preferably at least 0.5 wt-%, even more preferably at least 1 wt-%, even more preferably at least 2 wt-%, even more preferably greater than 2 wt-%, even more preferably at least 3 wt-%, even more preferably at least 4 wt-%, even more preferably at least 5 wt-%, and even more preferably at least 10 wt-%, based on the total weight of the coating composition. The nanoparticle concentration is preferably no greater than 30 wt-%, more preferably no greater than 20 wt-%, and even more preferably no greater than 10 wt-%, based on the total weight of the coating composition. Above about 30 percent by weight the coating composition becomes difficult to apply in the desired thickness range and below about 0.1 percent by weight, excessive time periods may be required for the coating to dry after application to the substrate. The terms "composition" and "solution" as used herein include dispersions or suspensions of nanoparticles in a liquid medium.

Functionalized Nanoparticles

Nanoparticles used in coating compositions of the present invention include amine groups, protected amine groups, or combinations thereof. Also, nanoparticles used in coating compositions of the present invention include amine-reactive groups. Such functional groups may be on the same nanoparticle or on different nanoparticles. Preferably, they are on different nanoparticles such that a portion of the nanoparticle population include amine and/or protected amine groups (preferably, amine groups) and a portion of the nanoparticle population include amine-reactive groups.

Exemplary amine-reactive groups include alpha,beta-ethylenically or acetylenically unsaturated groups with electron withdrawing groups (e.g., alpha,beta-unsaturated carbonyl and sulfone groups), epoxy groups, carboxylic acid-containing groups, anhydride groups, ester-containing groups, fluorosulfonyl groups, and the like. Preferred amine-reactive groups include alpha,beta-ethylenically or acetylenically unsaturated groups with electron withdrawing groups (e.g., alpha,beta-unsaturated carbonyl and sulfone groups) and epoxy groups. More preferred amine-reactive groups include epoxy groups.

In preferred embodiments, a portion of the nanoparticles of the present invention are functionalized with amine groups, protected amine groups, or combinations thereof, and a portion of the nanoparticles of the present invention are functionalized with epoxy groups. The nanoparticles functionalized with amine and/or protected amine groups are prepared separately from the nanoparticles functionalized with amine-reactive groups. These are then combined to allow for reaction between the amine groups and the amine-reactive groups upon drying of the coating composition.

The present invention involves the design of nanoparticle surface-chemistries that enable assembling/interconnecting the nanoparticles together through covalent chemical bonds (which can include a combination of organic-organic, organic-inorganic (e.g., C—N), or inorganic-inorganic bonds (e.g., Si—O—Si)), thereby forming a dendritic network. This network is believed to include a generally continuous phase of interbonded nanoparticles (which may be the same or different). Such structure contributes to the formation of hydrophilic coatings with improved properties relative to uncoated substrates.

For example, in one embodiment, as shown in Scheme I, amine-functionalized nanoparticles and epoxy-functionalized nanoparticles are combined into a coating composition and allowed to react to form a dendritic network upon drying. Preferably, such drying (and curing) occurs at a temperature of at least 80° C., and more preferably at a temperature of 80° C. to 160° C., depending on the material of the substrate on which the coating composition is coated.

Scheme I

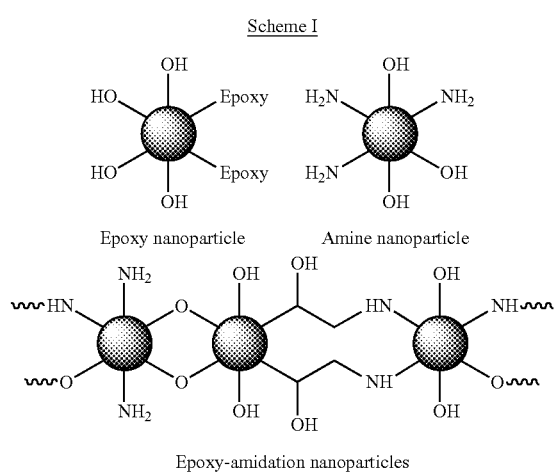

Epoxy nanoparticle    Amine nanoparticle

Epoxy-amidation nanoparticles

In another exemplary embodiment, as shown in Scheme II, amine-functionalized nanoparticles and alpha,beta-unsaturated-functionalized nanoparticles are combined into a coating composition and allowed to react to form a dendritic network upon drying, particularly when heated at a temperature of at least 80° C., and preferably at a temperature of 80° C. to 120° C. In this reaction, a Michael addition adduct results when an amine-functionalized nanoparticle covalently bonds to an alpha,beta-unsaturated-functionalized nanoparticle by means of a carbon-nitrogen bond involving reaction of an amino group of one nanoparticle and an alpha,beta-ethylenically unsaturated group at the alpha position (wherein the alpha,beta-ethylenically unsaturated groups shown include a carbonyl unit (acrylate group) or a sulfonyl unit (vinyl sulfone group) at the alpha position). The free acrylate groups shown in the Michael adduct are then capable of reacting with yet another nanoparticle bearing amine groups, thereby setting up a 3-dimensional dendritic network.

Scheme II

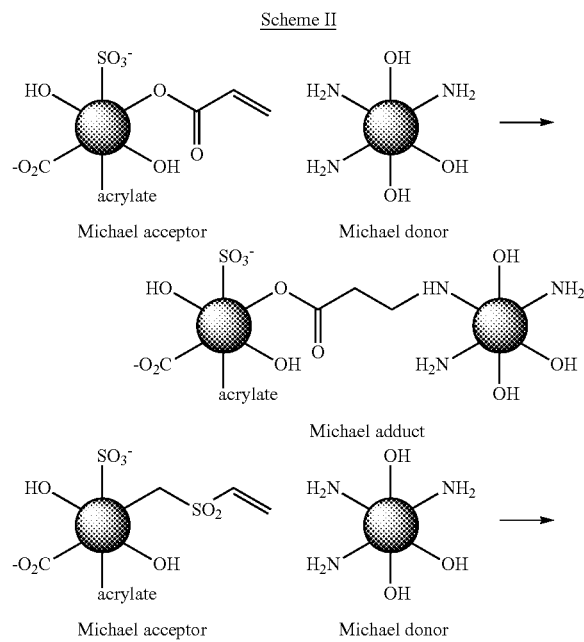

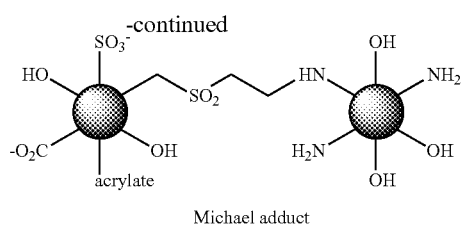

Michael adduct

The molar ratio of complementary reactive groups (e.g., amine groups and epoxy groups) can vary over a broad range. For example, the molar ratio of the amount of amine groups, protected amine groups, or combinations thereof to the amount of amine-reactive groups within a coating composition can be within a range of 95:5 to 5:95, and preferably 70:30 to 30:70. More preferably, the molar ratio of reactive groups within a coating composition is approximately equimolar (e.g., approximately equimolar amounts of amine groups relative to epoxy groups). In this context, "approximately" refers to plus or minus 2%.

The weight ratio of particles, each bearing a different complementary reactive group (e.g., one set of particles with amine groups and one set of particles with epoxy groups) can also vary over a wide range. For example, the weight ratio of particles can be 95:5 to 5:95, and preferably 70:30 to 30:70. A very wide particle weight ratio range is typically used when there is a wide differential between particle sizes. For example, 40-nm silica particles with amine functionality mixed with 4-nm silica particles with epoxy functionality can be used in a ratio of 95:5 to 5:95 because of the high surface functionality of smaller particles, which allows one to approach approximately equimolar ratio of reactive functionalities.

Further, improved mechanical durability and control of porosity can be obtained by combining nanoparticles of different sizes. Coatings resulting from larger particles such as 90 nm alone may not give the desired mechanical properties, but improved mechanical properties may be obtained by mixing the larger particles with smaller particles in certain ratios which may help to achieve particle packing, coating topology (they are important for mechanical durability). For example, when epoxy-functionalized nanoparticles having a diameter of 90 nm are mixed with amine-functionalized nanoparticles having a diameter of 5 nm improved durability can be obtained relative to mixtures of particles having the same particle size (whether they are both 20 nm or both 5 nm).

Amine or Protected Amine Functional Groups

In preferred embodiments, a portion of the nanoparticles of the present invention are functionalized with amine groups, which can be formed typically using aminosiloxane chemistry. The amine groups can be protected if desired. Combinations of protected amine groups and unprotected amine groups can be used if desired.

The amine groups are covalently bonded to a preferred silica surface of individual nanoparticles, preferably through Si—O—Si bonds. Other nanoparticles containing zirconia, alumina, ceria, tin oxide, or titanium dioxide, may similarly be attached to aminosiloxanes by the chemical bonds Zr—O—Si, Al—O—Si, Ce—O—Si, Sn—O—Si, and Ti—O—Si, respectively. These chemical bonds may not be as strong as the siloxane bond, Si—O—Si; however, their bond strength can be enough for the present coating applications.

The level of coverage of the amine-functionalized nanoparticles herein is reported in terms of the concentration of amine groups in the coating composition, assuming 100% of the amount of amine groups in the coating composition would be covalently bonded to surfaces of the silica particles. Preferably, the amine groups are present on a particle surface in the coating composition in an amount equivalent to at least 3 mole-% of the total molar functional groups on said surface.

More preferably, the amine groups are present on a particle surface in the coating composition in an amount equivalent to at least 5 mole-%, even more preferably at least 10 mole-%, and even more preferably at least 25 mole-%, of total molar functional groups on said surface. Higher molar equivalents of amine groups can contribute to more bonds between particles, thereby forming a coating with a more dense particle network. In certain situations, an excess of amine groups (i.e., greater than 100%) can be desirable; however, typically the amount of amine groups are present on a particle surface in the coating composition in an amount equivalent to no more than 150 mole-% of the total molar functional groups on said particle surface. Due to the multifunctionality of the alkoxy aminoalkyl-substituted organosilanes (e.g., 3-(2-aminoethyl)aminopropyl trimethoxysilane), when the coating composition includes more than 100 mole-% amine groups, more than a monolayer of the aminosiloxane is created on the particle surface. An excess of hydrolyzed alkoxy aminoalkyl-substituted organosilane, when present, can also function as a primer on the surface of the substrate.

The nanoparticle functionalization with amine groups can be accomplished using conventional techniques. For silica nanoparticles, however, it has been discovered that reacting alkoxy aminoalkyl-substituted organosilanes (e.g., 3-(2-aminoethyl)aminopropyl trimethoxysilane) to create amino functionality on the surface of the silica nanoparticles can be advantageously accomplished (for example, without gelling) using basic conditions. Preferably, this is accomplished at a pH of at least 10.5, even more preferably at a pH of at least 11.0, even more preferably at a pH of at least 11.5, even more preferably at a pH of at least 12.0, and even more preferably at a pH of at least 12.5. A typically upper pH is 14.0. In a typical method, the pH of an aqueous dispersion of silica nanoparticles is initially adjusted to this pH to generate negatively charged silica particles. Then the alkoxy aminoalkyl-substituted organosilane is combined with the negatively charged silica nanoparticles and allowed to react for a time effective for the alkoxysilyl end of the alkoxy aminoalkyl-substituted organosilane to preferentially react with the negatively charged silica surface. Such pH is maintained for a time effective to cause reaction between the alkoxysilyl end of the alkoxy aminoalkyl-substituted organosilane and the silica nanoparticles. Typically, this is at least 2 hours, preferably at least 8 hours, and more preferably at least 12 hours. Temperatures above room temperature (e.g., 60° C.-80° C.) can be used to reduce the reaction time. The desired pH and time of reaction are ones that enhance functionalization and enhance stability of the composition (e.g., reduce precipitation and/or agglomeration of the particles). After the functionalization reaction is carried out to the desired level (preferably, completed), the pH of the coating solution may be brought to a desired pH (e.g., to a range of 5 to 8).

The functional groups include various chemical groups that allow for binding to the nanoparticles. Such groups are typically provided by functional compound represented by the formula A-L-F1. The functional group F1 includes the amine groups. In this representation, the group A is the nanoparticle surface-bonding group, and L can be a bond or any of a variety of organic linkers. Organic linkers L can be linear or branched alkylene, arylene, or a combination of alkylene and arylene groups, optionally including heteroatoms.

Exemplary amine functional compounds include:

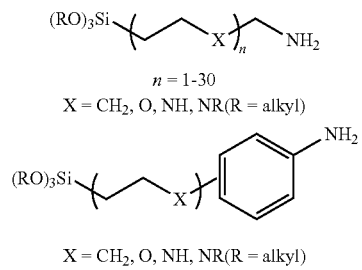

$n = 1-30$
$X = CH_2, O, NH, NR(R = alkyl)$ $X = CH_2, O, NH, NR(R = alkyl)$

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. For amine functional compounds A-L-F1, the surface-bonding groups A are typically silanols, alkoxysilanes, or chlorosilanes, which can be monofunctional, difunctional, or trifunctional. For example, the silanol groups on the surfaces of the silica nanoparticles are reacted with at least one silanol, alkoxysilane, or chlorosilane group of a functional compound to form a functionalized nanoparticle. Exemplary conditions for reacting functional compounds with silica nanoparticles are described in the Examples Section.

The amine groups can be protected if desired. Typically, amine groups may be converted to a protected form by reaction with a suitable reagent that reacts with (i.e., protects) the amine and converts it to a form without hydrogen atoms bonded to the nitrogen atom. Subsequent deprotection regenerates the original amine group. Methods for protecting amine groups, and deprotecting the corresponding protected amine groups, are widely known and are described, for example, by P. J. Kocienski in "Protecting Groups", 3rd ed., Stuttgart: Thieme, 2004 and by T. W. Greene and P. G. M. Wuts in "Protective Groups in Organic Synthesis", 2nd ed., New York: Wiley-Interscience, 1991. Suitable protecting groups include $CH_3C(O)—$, $CF_3C(O)—$, $(CH_3)_3Si—$, $(CH_3)_2CH—O—C(O)—$, $CH_3—O—C(O)—C(O)—$, $—C(O)OH$, $—C(O)O^-$, and alkyl-$NH—C(O)—$ wherein "—" represents a bond to the Nitrogen.

Amine-Reactive Groups

Nanoparticles of the present invention can include amine-reactive groups. These can be the same nanoparticles that contain the amine and/or protected amine groups or different nanoparticles. Preferably, the nanoparticles with covalently bound amine-reactive groups are different nanoparticles than those with covalently bonded amine and/or protected amine groups. Exemplary amine-reactive groups include alpha,beta-ethylenically or acetylenically unsaturated groups with electron withdrawing groups, epoxy groups, carboxylic acid-containing groups, carbon halides, anhydride groups, ester-containing groups, and the like. Preferred amine-reactive groups include epoxy groups and alpha,beta-ethylenically or acetylenically unsaturated groups with electron withdrawing groups. More preferred amine-reactive groups include epoxy groups.

The level of coverage of the amine-reactive functional groups herein is reported in terms of the concentration of amine-reactive functional groups in the coating composition, assuming 100% of the amount of amine-reactive groups in the coating composition would be covalently bonded to surfaces of the nanoparticles. Preferably, the amine-reactive functional groups are present on a particle surfaces in the coating composition in an amount equivalent to at least 3 mole-% of the total molar functional groups on said surface.

More preferably, the amine-reactive functional groups are present on a particle surface in the coating composition in an amount equivalent to at least 5 mole-%, even more preferably at least 10 mole-%, and even more preferably at least 25 mole-%, of total molar functional groups on the particle surface. Higher molar equivalents of amine-reactive functional groups can contribute to more bonds between particles, thereby forming a coating with a more dense particle network. In certain situations, an excess of amine-reactive functional groups (i.e., greater than 100%) can be desirable; however, typically the amount of amine-reactive functional groups on a particle surface in the coating composition is no more than 150 mole-% of the total molar functional groups on the particle surface.

The nanoparticle functionalization with amine-reactive functional groups can be accomplished using conventional techniques.

The functional groups include various chemical groups that allow for binding to the nanoparticles. Such groups are typically provided by functional compound represented by the formula A-L-F2. The functional group F2 includes the amine-reactive groups. In this representation, the group A is the nanoparticle surface-bonding group, and L can be a bond or any of a variety of organic linkers. Organic linkers L can be linear or branched alkylene, arylene, or a combination of alkylene and arylene groups, optionally including heteroatoms.

Exemplary amine-reactive functional compounds include:

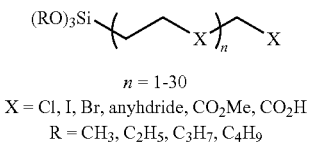

$n = 1-30$
X = Cl, I, Br, anyhdride, $CO_2Me$, $CO_2H$
R = $CH_3$, $C_2H_5$, $C_3H_7$, $C_4H_9$ A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. For amine-reactive functional compounds A-L-F2, the surface-bonding groups A are typically silanols, alkoxysilanes, or chlorosilanes, which can be monofunctional, difunctional, or trifunctional. For example, the silanol groups on the surfaces of the silica nanoparticles are reacted with at least one silanol, alkoxysilane, or chlorosilane group of a functional compound to form a functionalized nanoparticle. Exemplary conditions for reacting functional compounds with silica nanoparticles are described in the Examples Section.

Epoxy Functional Groups

In preferred embodiments, a portion of the nanoparticles of the present invention are functionalized with amine-reactive groups, such as epoxy groups, which can be formed, for example, using epoxy alkoxysilane chemistry. The epoxy groups are covalently bonded to a preferred silica surface of individual nanoparticles, preferably through Si—O—Si bonds. Other nanoparticles containing zirconia, alumina, ceria, tin oxide, or titanium dioxide, may similarly be attached to epoxy alkoxysilanes by the chemical bonds Zr—O—Si, Al—O—Si, Ce—O—Si, Sn—O—Si, and Ti—O—Si, respectively. These chemical bonds may not be as strong as the siloxane bond, Si—O—Si, however, their bond strength can be enough for the present coating applications.

The level of coverage of the epoxy-functionalized nanoparticles herein is reported in terms of the concentration of epoxy groups in the coating composition, assuming 100% of the amount of epoxy groups in the coating composition would be covalently bonded to surfaces of the silica particles. Preferably, the epoxy groups are present on a particle surface in the coating composition in an amount equivalent to at least 3 mole-% of the total molar functional groups on said surface.

More preferably, the epoxy groups are present on a particle surface in the coating composition in an amount equivalent to at least 5 mole-%, even more preferably at least 10 mole-%, and even more preferably at least 25 mole-%, of total molar functional groups on the particle surface. Higher molar equivalents of epoxy groups can contribute to more bonds between particles, thereby forming a coating with a more dense particle network. In certain situations, an excess of epoxy groups (i.e., greater than 100%) can be desirable; however, typically the amount of epoxy groups on a particle surface in the coating composition is no more than 150 mole-% of the total molar functional groups on the particle surface. Due to the multifunctionality of the epoxy alkoxysilanes, when the coating composition includes more than 100 mole-% epoxy groups, more than a monolayer of the epoxysiloxane is created on the particle surface. An excess of hydrolyzed epoxy alkoxysilane, when present, can also function as a primer on the surface of the substrate.

The nanoparticle functionalization with epoxy groups can be accomplished using conventional techniques. For silica nanoparticles, however, it has been discovered that this can be advantageously accomplished by functionalizing the nanoparticles using epoxy functional compounds under acidic conditions. Preferably, the pH is no greater than 6, more preferably at a pH of no more than 5, even more preferably at a pH of no more than 3, and even more preferably at a pH of 1 to 3. Such pH is maintained for at least 3 hours, preferably at least 8 hours, and more preferably at least 12 hours. The desired pH and time of reaction are ones that enhance functionalization, enhance stability of the composition (e.g., reduce precipitation and/or agglomeration of the particles), and enhance antifogging characteristics of the resultant coating. For nanoparticles of 4-5 nm, the preferred pH range for the functionalization reaction is 1 to 3. After the functionalization reaction is carried out to the desired level (preferably, completed), the pH of the coating solution may be brought to a desired pH (e.g., to a range of 5 to 8).

The functional groups include various chemical groups that allow for binding to the nanoparticles. Such groups are typically provided by functional compound represented by the formula A-L-F3. The functional group F3 includes the epoxy groups. In this representation, the group A is the nanoparticle surface-bonding group, and L can be a bond or any of a variety of organic linkers. Organic linkers L can be linear or branched alkylene, arylene, or a combination of alkylene and arylene groups, optionally including heteroatoms.

Exemplary epoxy functional compounds include:

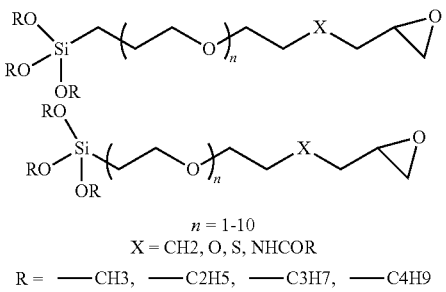

n = 1-10
X = CH2, O, S, NHCOR
R = —CH3, —C2H5, —C3H7, —C4H9

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. For epoxy functional compounds A-L-F3, the surface-bonding groups A are typically silanols, alkoxysilanes, or chlorosilanes, which can be monofunctional, difunctional, or trifunctional. For example, the silanol groups on the surfaces of the silica nanoparticles are reacted with at least one silanol, alkoxysilane, or chlorosilane group of a functional compound to form a functionalized nanoparticle. Exemplary conditions for reacting functional compounds with silica nanoparticles are described in the Examples Section.

Alpha, Beta-Unsaturated Functional Groups

In certain embodiments, a portion of the nanoparticles of the present invention are functionalized with amine-reactive groups, such as alpha,beta-unsaturated groups, which can be formed, for example, using alkoxysilane chemistry. The alpha,beta-unsaturated groups are covalently bonded to a preferred silica surface of individual nanoparticles, preferably through Si—O—Si bonds. Other nanoparticles containing zirconia, alumina, ceria, tin oxide, or titanium dioxide, may similarly be attached to alkoxysilanes by the chemical bonds Zr—O—Si, Al—O—Si, Ce—O—Si, Sn—O—Si, and Ti—O—Si, respectively. These chemical bonds may not be as strong as the siloxane bond, Si—O—Si, however, their bond strength can be enough for the present coating applications.

As used herein, "alpha,beta-unsaturated groups" are alpha,beta-ethylenically or acetylenically unsaturated groups with electron withdrawing groups. Nonlimiting examples of electron withdrawing groups include carbonyls, ketones, esters, amides, —SO2—, —SO—, —CO—CO—, —CO—COOR (wherein R=CH3, C2H5, C3H7, C4H9), sulfonamides, halides, trifluoromethyl, sulfonamides, halides, maleimides, maleates, or combinations thereof. For certain embodiments, the electron withdrawing groups is a ketone, ester, or amide.

The level of coverage of the alpha,beta-unsaturated-functionalized nanoparticles herein is reported in terms of the concentration of alpha,beta-unsaturated groups in the coating composition, assuming 100% of the amount of alpha,beta-unsaturated groups in the coating composition would be covalently bonded to surface of the silica particles. Preferably, the alpha,beta-unsaturated groups are present on a particle surface in the coating composition in an amount equivalent to at least 3 mole-% of the total molar functional groups on said surface.

More preferably, the alpha,beta-unsaturated groups are present on a particle surface in the coating composition in an amount equivalent to at least 5 mole-%, even more preferably at least 10 mole-%, and even more preferably at least 25 mole-%, of total molar functional groups on the particle surface. Higher molar equivalents of alpha,beta-unsaturated groups can contribute to more bonds between particles, thereby forming a coating with a more dense particle network. In certain situations, an excess of alpha,beta-unsaturated groups (i.e., greater than 100%) can be desirable; however, typically the concentration of alpha,beta-unsaturated groups in the coating composition is no more than 150 mole-% of the total molar functional groups on the particle surface. Due to the multifunctionality of the alpha,beta-unsaturated alkoxysilanes, when the coating composition includes more than 100 mole-% alpha,beta-unsaturated groups, more than a monolayer of the alpha,beta-unsaturated alkoxysilane is created on the particle surface. An excess of hydrolyzed alpha,beta-unsaturated alkoxysilane, when present, can also function as a primer on the surface of the substrate.

Typically, the nanoparticle functionalization is accomplished by functionalizing the nanoparticles with alpha,beta-unsaturated groups.

The functional groups include various chemical groups that allow for binding to the nanoparticles. Such groups are typically provided by functional compound represented by the formula A-L-F4. The functional group F4 includes the alpha,beta-unsaturated groups. In this representation, the group A is the nanoparticle surface-bonding group, and L can be a bond or any of a variety of organic linkers. Organic linkers L can be linear or branched alkylene, arylene, or a combination of alkylene and arylene groups, optionally including heteroatoms.

Exemplary alpha,beta-unsaturated functional compounds include:

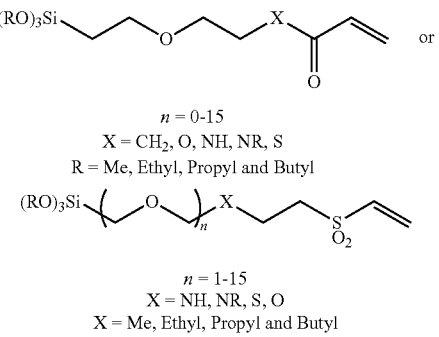

n = 0-15
X = CH2, O, NH, NR, S
R = Me, Ethyl, Propyl and Butyl n = 1-15
X = NH, NR, S, O
X = Me, Ethyl, Propyl and Butyl In certain embodiments, the alpha,beta-unsaturated functional compound is an acrylate or an alpha,beta-unsaturated ketone. Acrylates and alpha,beta-unsaturated ketones exhibit the desirable properties of stability in water over a wide range of pH and yet also exhibit high reactivity with primary amines to irreversibly form a Michael addition adduct.

A Michael addition adduct results when an amine-functionalized nanoparticle covalently bonds to an alpha,beta-unsaturated-functionalized nanoparticle by means of a carbon-nitrogen bond as shown above in Scheme II.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. For alpha,beta-unsaturated functional compounds A-L-F4, the surface-bonding groups A are typically silanols, alkoxysilanes, or chlorosilanes, which can be monofunctional, difunctional, or trifunctional. For example, the silanol groups on the surfaces of the silica nanoparticles are reacted with at least one silanol, alkoxysilane, or chlorosilane group of a functional compound to form a functionalized nanoparticle. Exemplary conditions for reacting functional compounds with silica nanoparticles are described in the Examples Section.

Optional Hydrophilic Groups

If desired, to enhance hydrophilicity of the functionalized nanoparticles (either the nanoparticles functionalized with amine groups and/or protected amine groups, the nanoparticles functionalized with amine-reactive groups, or both) of the present invention, additional hydrophilic (e.g., water-dispersible, water-soluble, and/or charged) groups can be covalently attached to individual particles. Hydrophilic groups (e.g., water-dispersible groups, water-soluble, and/or charged groups) are monovalent groups that are capable of providing hydrophilic characteristics to the nanoparticle surface, thereby reducing, and preferably preventing, excessive agglomeration and/or precipitation of the nanoparticles in an aqueous environment (although small amounts of agglomeration can be tolerated when the nanoparticles are in an aqueous environment as long as the average size of the agglomerates is preferably no greater than 60 nm).

As used herein, the term "hydrophilic compound" (e.g., "water-dispersible compound," "water-soluble" and/or charged) describes a compound that can react with a surface of the nanoparticles to modify it with hydrophilic groups (e.g., water-dispersible groups). It can be represented by the formula A-L-WD, wherein A are the surface-bonding groups, which may be the same or different as other surface-bonding groups described herein, WD represents the hydrophilic groups (e.g., water-dispersible groups, water-soluble groups, and/or charged groups), and L represents an organic linker or a bond. Organic linkers L can be linear or branched alkylene, arylene, or a combination of alkylene and arylene groups, optionally including heteroatoms.

The hydrophilic groups are water-like groups. They typically include, for example, anionic groups, cationic groups, groups that are capable of forming an anionic group or cationic group when dispersed in water (e.g., salts or acids), or mixtures thereof. The anionic or anion-forming groups can be any suitable groups that contribute to anionic ionization of the surface. For example, suitable groups include: carboxylate groups and structural units bearing multiple carboxylate groups, exemplified by bonded ethylenediamine triacetatic acid group and by bonded citric acid; sulfate half-ester groups and structural units bearing multiple sulfate half-ester groups; sulfonate groups and structural units bearing multiple sufonate groups; phosphate mono- and/or diester groups and structural units bearing multiple phosphate mono and/or diester groups; phosphonate groups and structural units bearing multiple phosphonate groups; and similar groups, and acids thereof.

The cationic or cation-forming groups can be any suitable groups that contribute to cationic ionization of the surface. For example, suitable groups include quaternary ammonium groups, quaternary phosphonium groups, tertiary sulfonium groups, combinations thereof, and structural units bearing multiples thereof.

Other suitable hydrophilic groups include hydroxyl groups, polyethylene oxide groups, combinations thereof, and structural units bearing multiples thereof.

The hydrophilic groups may be neutral, but many are charged. "Charged groups" refer to groups that have one or more than one ionizable group per functional group.

In certain embodiments, preferred hydrophilic groups include carboxylic acid groups, sulfonic acid groups, phosphonic acid groups, or combinations thereof.

In certain embodiments, the attachment of water-dispersible groups on the surface of nanoparticles, significantly, means that dispersions thereof do not require external emulsifiers, such as surfactants, for stability. However, if desired anionic and cationic water-dispersible compounds can also be used in a composition that includes the functionalized nanoparticles to function as an external emulsifier and assist in the dispersion of the nanoparticles.

The hydrophilic groups can be provided using hydrophilic compounds of the formula A-L-WD. Suitable surface-bonding groups A of the hydrophilic compounds are described herein for the epoxy functional compounds, for example. Examples include silanols, alkoxysilanes, or chlorosilanes.

Some preferred hydrophilic compounds include the following:

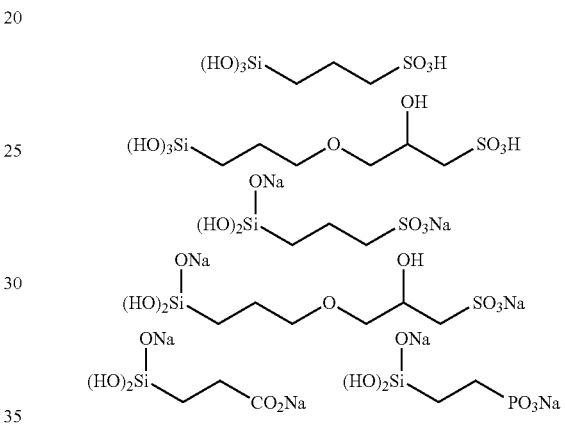

as well as other known compounds.

Those of ordinary skill in the art will recognize that a wide variety of other hydrophilic compounds are useful in the present invention as external emulsifiers or as compounds that can be used to modify the nanoparticles with water-dispersible groups.

Preferably, a sufficient amount of hydrophilic compound is reacted with the nanoparticles to provide the desired level of hydrophilicity without interfering with the antifogging, antireflective, and cleanable characteristics of the compositions of the present invention.

The level of coverage of the nanoparticles by hydrophilic groups herein is reported in terms of the concentration of hydrophilic groups in the coating composition, assuming 100% of the amount of hydrophilic groups in the coating composition would be covalently bonded to surface of the particles. If used, the hydrophilic groups are preferably present on a nanoparticle surface in the coating composition in an amount equivalent to at least 1 mole-%, and more preferably at least 10 mole-%, of the total molar functional groups on said surface. If used, the hydrophilic groups are preferably present on a nanoparticle surface in the coating composition in an amount equivalent to no more than 60 mole-%, more preferably no more than 50 mole-%, more preferably, no more than 20 mole-%, and even more preferably no more than 10 mole-%, of the total molar functional groups on said surface.

Preferably, the desired level of hydrophilicity is such that an external emulsifier is not necessary for preparing a storage-stable dispersion.

Optional Additives

In certain embodiments, the compositions of the present invention include one or more surfactants. The term "surfactant" as used herein describes molecules that reduce the surface tension of the coating composition and provide a coating which imparts desirable antifog, easy-cleaning, antireflective, and antistatic characteristics to substrates or articles coated therewith. Useful surfactants of the present invention include anionic, cationic, nonionic, or amphoteric surfactants. Examples include the following:

| Surfactant Type | Surfactant Name | Product Name | Source |
| --- | --- | --- | --- |
| Anionic | Sodium dodecyl benzene sulfonate | DS-10 | Rhone-Poulenc |
| Amphoteric | N-coco-aminopropionic acid | MIRATAINE AP-C | Rhone-Poulenc |
| Amphoteric | Cocaamidopropyl betaine | CAPB-30S | Shanghai Gaowei Chemical Co. |
| Nonionic | Lauryl dimethylamine oxide | RRODAMOX LO | Rhone-Poulenc |
| Nonionic | Alkyl polyglucoside | TRITON BG10 | Dow Chemical |
| Nonionic | PEG/PPG/PEG block copolymer | PLURONIC F38 | BASF Corp. |
| Nonionic | Organosilicone surfactant | BYK-333 | BYK |
| Nonionic | Organosilicone surfactant | Q2-5211 | Dow-Corning |
| Nonionic | Fluorochemical surfactant | FC-4430 | 3M |
| Nonionic | Fluorochemical surfactant | FC-4432 | 3M |
| Nonionic | Polyoxyethylene (7) lauryl ether | AEO7-24S | Sasol (China) Chemical Co., Ltd. |
| Nonionic | Polyoxyethylene (9) lauryl ether | AEO7-24S | Sasol (China) Chemical Co., Ltd. |
| Nonionic | Polyoxyethylene (18) lauryl ether | AEO7-24S | Sasol (China) Chemical Co., Ltd. |
| Cationic | Di-oleic acid triethanolamine esterquat | PRAEPAGEN 4317 | Clariant Chemicals (China) Ltd. |
| Cationic | Di-tallow dimethyl ammonium chloride | PRAEPAGEN 3345 | Clariant Chemicals (China) Ltd. |
| Cationic | Alkyldimethylbenzyl-ammonium chloride | DODIGEN 226 | Clariant Chemicals (China) Ltd. |
| Anionic Sulfosuccinate | Dioctyl ester of sodium sulfosuccinic acid | AEROSOL OT | Cytec Industries |
| Anionic Sulfosuccinates | Alkyl benzenesulfonic acid (C10-C16) | POLYSTEP A-13 | Stepan Company |
| Anionic Alkylbenzene sulfonates and sulfates | Sodium branched alkyl (C12) benzene sulfonate | POLYSTEP A-16 | Stepan Company |
| Anionic Alkylbenzene sulfonates and sulfates | Sodium dodecyl benzene sulfonate | RHODOCAL DS-10 | Rhone-Poulenc |
| Anionic Polyethoxylated derivatives of straight or branched chain aliphatic sulfate | Polyethoxylated alkyl (C12) ether sulfate, ammonium salt | STEOL CA-460 | Stepan Company |
| Anionic Straight or branched chain aliphatic sulfates and sulfonates | Aliphatic sulfates | HOSTASTAT HS-1 | Hoechst Celanese Corp. |
| Anionic Alkylbenzene sulfonates and sulfates | Sodium linear alkyl (C12) benzene sulfonate | POLYSTEP A-15 | Stepan Company |
| Anionic Alkyl carboxylate | Sodium stearate | | Witco |
| Amphoteric Alkyl carboxylates | N-coco-aminopropionic acid | MIRATAINE AP-C | Rhone-Poulenc |
| Anionic Alkyl phosphate mono- or di-ester | Ethoxylated dodecyl alcohol phosphate ester, sodium salt | RRODAFAC MC-470 | Rhone-Poulenc |
| Nonionic Polyethoxylated alkyl alcohol | Polyoxyethylene (23) lauryl ether | BRIJ 35 | ICI Americas Inc. |

| Surfactant Type | Surfactant Name | Product Name | Source |
|---|---|---|---|
| Nonionic Polyethoxylated alkyl alcohol | Plyoxyethylene (4) lauryl ether | BRIJ 30 | ICI Americas Inc. |
| Nonionic Polyethoxylated alkyl alcohol | Polyoxyethylene (7) lauryl ether | AEO7-24S | Sasol (China) Chemical Co., Ltd. |
| Nonionic Polyethoxylated alkyl alcohol | Polyoxyethylene (9) lauryl ether | AEO9-24S | Sasol (China) Chemical Co., Ltd. |
| Nonionic Polyethoxylated alkyl alcohol | Polyoxyethylene (18) lauryl ether | AEO18-24S | Sasol (China) Chemical Co., Ltd. |
| Nonionic Block copolymers of polyethylene oxide and polypropylene oxide | Block copolymer of ethylene oxide and propylene oxide | TETRONIC 1502 | BASF Corp. |
| Nonionic Block copolymers of polyethylene oxide and polypropylene oxide | PEG-PPG-PEG block copolymer | PLURONIC F38 | BASF Corp. |
| Nonionic Block copolymers of polyethylene oxide and polypropylene oxide | PEG-PPG-PEG block copolymer | TETRONIC 908 | BASF Corp. |
| Nonionic Amine oxide | Lauryl dimethylamine oxide | RHODAMOX LO | Rhone-Poulenc |
| Nonionic Polyethoxylated alkyl alcohol | Ethoxylated trimethylnonanol | TERGITOL TMN-6 | Union Carbide Chemical & Plastics Co. |

Preferred surfactants are organosilicone surfactants (e.g., polyether modified dimethylpolysiloxane), lauryl dimethylamine oxide, and fluorochemical surfactants. For products that include a silicone surface (e.g., silicone substrate or silicone coating such as a silicone hardcoat), more preferred surfactants are organosilicone surfactants.

If used, the surfactant concentration in coating compositions of the present invention is preferably at least 0.1 percent by weight (wt-%) of the coating composition, more preferably at least 0.4 wt-%, and even more preferably at least to 1 wt-%. If used, the surfactant concentration is preferably no greater than 10 wt-% of the coating composition, more preferably no greater than 5 wt-% of the coating composition.

Another optional but preferred additive is an antimicrobial agent. Examples include the following (with information with respect to solubility in water):

| Product Name | Composition | Company | Soluble in Water |
|---|---|---|---|
| KATHON CG | 5-Chloro-2-methyl-4-isothiazolin-3-one 2-Methyl-4-isothiazolin-3-one Magnesium chloride Magnesium nitrate Water | Rohm & Haas | Good |
| C302 | 1,3-Dimethylol-5,5-dimethylhydantoin | Shanghai JiuXin Chem. Co. Ltd. | Good |
| PROTECTOL PE/PES | 2-Phenoxyethanol | BASF | Dissolves in hot water |
| METHYL-SARABEN | Methyl-p-hydrobenzoate | Taizhou Necchem Company (China) | Dissolves in hot water |
| PROPYL-SARABEN | Propyl-p-hydrobenzoate | Taizhou Necchem Company (China) | Does not dissolve in hot water |
| DODIGEN 226 | Alkyldimethyl-benzyl-ammonium chloride | Clariant Chemicals (China) Ltd. | Good |
| NIPACIDE BIT20 | Benzisothiazolinone | Clariant Chemicals (China) Ltd. | Good |

If used, the antimicrobial concentration in coating compositions of the present invention is preferably at least 0.0005 percent by weight (wt-%) of the total weight of the coating composition, more preferably at least 0.001 wt-%, and even more preferably at least 0.002 wt-%. If used, the antimicrobial concentration is preferably no greater than 1 wt-%, and more preferably no greater than 0.1 wt-% of the total weight of the coating composition.

Typically, the coating compositions of the present invention include water as the liquid carrier (i.e., fluid media); however, organic solvents can be used in addition to the water. Suitable organic solvents in the present invention include methanol, ethanol, isopropanol, butanol, propylene glycol and its monomethyl ether, ethylene glycol and its monomethyl ether, ketones such as acetone and methyl ethyl ketone, and ethers such as tetrahydrofuran (THF), N,N-dimethylacetamide, formamide, or combinations thereof. If present, typically the organic solvent is an alcohol or combination of alcohols. The amount of organic solvent in the coating composition is typically no more than 30 wt-%, preferably no more than 10 wt-%, more preferably no more than 5 wt-%, even more preferably no more than 2 wt-%, and even more preferably no more than 1 wt-%, based on the total weight of the liquid medium. The most preferred liquid medium is 100% water.

Tetraalkoxy coupling agents, such as tetraethylorthosilicate (TEOS) and oligomeric forms, such as alkyl polysilicates (e.g., poly(diethoxysiloxane)), may also be useful to improve binding between nanoparticles. The amount of coupling agent included in the coating composition should be limited in order to prevent destruction of the antireflective or antifog properties of the coating. The optimal amount of coupling agent is determined experimentally and is dependent on the coupling agent's identity, molecular weight, and refractive index. The coupling agent(s), when present, can be added to the composition at levels of 0.1 to 20 percent by weight of the nanoparticle concentration, and more preferably 1 to 15 percent by weight of the nanoparticles.

Also, durability of the coatings on organic substrates can be improved by the incorporation of TEOS delivered, for example, by ethanol under acidic conditions. For instance, a coating formulation consisting of a 1:1 ratio of 20-nm silica nanoparticles surface-covered with 100% epoxy silanol and 20-nm silica nanoparticles surface covered with amine silanol combined with TEOS in a weight ratio of 90:10 or 80:20 tolerated more strong rubs with both wet and dry KIMWIPE tissues than when no TEOS is used, while the antifogging and antireflection properties were not affected. Although not wishing to be bound by theory, it is believed that the improved durability may result from the hydrolyzed tetraalkoxysilane groups, which provide increased siloxane bonding to reinforce the interactions among the hydrophilic nanoparticles. This is especially true for polymeric chains having numerous silanol functionalities enabling siloxane condensation with the silanol groups of the hydrophilic nanoparticles. It is known that the hydrolysis of tetraalkoxysilanes gives polymeric chain structures under acidic conditions.

Improved mechanical durability of the hydrophilic coatings of the present invention can also be accomplished in the presence of naked silica nanoparticles, especially in the presence of 5-nm silica nanoparticles. The content of naked silica nanoparticles could be as much as 50-60% by weight of the amount of nanoparticles.

Articles

The coatings, when applied to a substrate (e.g., of inorganic and/or organic material) and dried, are removable or permanent. Substrates to which the coating compositions of the invention can be applied are preferably transparent or translucent to visible light. They include organic, inorganic materials, or combinations thereof. Exemplary substrates are made of polyester (e.g., polyethylene terephthalate (PET), polybutylene terephthalate), polycarbonate (PC), allyldiglycolcarbonate, polyacrylates such as polymethylmethacrylate, polystyrene, polysulfone, polyethersulfone, cellulose acetate butyrate, glass, polyolefin, PVC and the like, including blends and laminates thereof.

Typically the substrate is in the form of a film, sheet, panel or pane of material and is part of an article such as a solar panel, protective eye wear, face masks, face shields, surgical masks, and various other types of personal protection equipment, particularly for eyes, as well as mirrors, motor vehicle windows and windshields. The coatings may, if desired, cover only a portion of the article, e.g., only the section immediately adjacent the eyes in a face shield may be coated. The substrate may be flat, curved, or shaped. The article to be coated may be produced by any method such as by blowing, casting, extruding, or injection molding.

The compositions can be coated on a substrate as a fluid coating composition such as in the form of a liquid-based coating composition (e.g., in a pourable form or sprayable form) using conventional techniques, for example, such as bar, roll, curtain, rotogravure, spray, or dip coating techniques. Sprayers and nozzle systems suitable for use in this application are known to one skilled in the art and include, for example, hydraulic, pneumatic, rotary and ultrasonic nozzles and associated sprayer systems. An example of a hydraulic sprayer is the MSO sprayer available for US Global Resources (Seattle, Wash.). Examples of suitable pneumatic sprayers include the EGA Manual Touch-Up Gun available from DeVilbiss Corporation (Glendale Hts., Ill.) or the AJ-401-LH sprayer available from Jacto (Tualaltin, Oreg.). Rotary atomizers use a high speed rotating disk, cup or wheel to disperse the liquid into a hollow cone spray. The rotational speed controls the drop size. Examples of rotary atomizers include PROPTEC and PENGUIN atomizers available from Ledebuhr Industries (Williamston, Mich.). Ultrasonic atomizers use a high (20 kHz to 50 kHz) frequency vibration of a piezoelectric crystal to produce narrow drop size distribution and low velocity spray. Examples of suitable sprayers with ultrasonic atomizer nozzles include models VC5020AT and VC5040AT available from Sonics and Materials, Inc. (Newtown, Conn.).

Alternatively, the compositions of the present invention can be coated on a substrate by simply wiping a pad, cloth, paper towel, or other application device/material over the surface of the substrate, wherein the composition is contained within the pad, cloth, etc. or applied to the surface of the substrate surface. Suitable applicator substrates can be in the form of a sponge, foam, woven, nonwoven, or knit material, for example. The term "nonwoven web" or "nonwoven fabric" refers to a web or fabric having a structure of individual fibers that are interlaid in an irregular manner. In contrast, knit or woven fabrics have fibers that are interlaid in a regular manner. Materials of the applicator substrate (e.g., applicator pad or wipe) can include synthetic or natural fibers, filaments, or yarns. Suitable materials include, but are not limited to, polyolefins, polyesters, polyamides (e.g., nylons), polyurethanes, halogenated polyolefins, polyacrylates, polyureas, polyacrylonitriles, cellulose, cotton, rayon, jute, hemp, as well as copolymers and polymer blends thereof. Various combinations of materials in various shapes can be used for applicator substrates if desired. The most typical substrate is a paper wipe containing the coating composition (soaked or impregnated into the wipe).

The coatings of the present invention can be coated on one side or both sides of a substrate. The coatings of the present invention may be coated on one side of the substrate and the opposite side of the substrate may be uncoated or coated with a wide variety of conventional compositions, particularly conventional antifogging compositions. Preferably, the coating surface should face the direction of higher humidity, e.g., on a face shield the side having an antifog coating should face the wearer.

A coated surface may be dried at room temperature (e.g., over a 15 minute period) or if desired, at elevated temperatures, to dry more quickly (such as within 5 minutes). For coating compositions of the present invention, drying conditions can impact, for example, the durability, removability, and permanency of the dried coating. A "dried" coating (i.e., one in which the liquid carrier (i.e., fluid media) has been substantially completely removed, for example, by evaporation, from the coating composition) is typically also "cured" as a result of reaction between the reactive functional groups (e.g., amine groups and epoxy groups). Such curing can be enhanced by heating the coating composition during the drying process. For example, drying conditions can include a temperature of at least 80° C., or a temperature of at least 100° C., or at a temperature of at least 120° C. The substrate on which the coating composition is applied typically controls the temperature of drying. For example, for glass substrates, coatings can generally be dried at temperatures of 120° C. to 160° C. Generally, for plastic substrates, coatings can be dried at temperatures of 120° C. to 140° C., and more specifically, for PET substrates, coatings can be dried at temperatures of 120° C. to 135° C., and for PMMA substrates, coatings can be dried at temperatures of only up to 80° C.

Additionally, the coatings can be heated at temperatures and times typical of glass tempering (e.g., temperatures such as 700 to 750° C. for 2 to 5 minutes) do not destroy the properties important to solar cell coatings (high light transmittance, antireflection, anti-soiling, and anti-abrasion) even though Transmission Electron Microscopy (TEM) and ESCA do indicate some changes to the shape of the particles and the elemental composition of the coatings on the particles after the tempering process. However, the specific tempering conditions mentioned do not appear to sinter the particles. Tempering may be necessary for commercialized solar glass and thus the coating compositions may be applied before or after tempering. The relatively lower refractive index caused by the nanostructure imparts antireflection properties which can, at least in some embodiments, improve light transmittance by 1.5 to 2 percent and thus improves light to power conversion by 1 to 2 percent. Even under these high temperature tempering conditions, the resulting coatings can impart higher power conversion than naked silica particles.

The functional groups on the nanoparticles can contribute to adhesion of the coating to a substrate. For example, excess amine groups (excess relative to their complementary reactive groups, e.g., epoxy groups) and/or excess epoxy groups can react with functionalities of a surface to form covalent bonds between the nanoparticles and the substrate. Alternatively or additionally, a substrate can be treated to improve adhesion between the substrate and the coating, using, e.g., chemical treatment, mechanical roughening, corona treatment such as air or nitrogen corona, plasma, flame, or actinic radiation. If desired, an optional tie layer can also be applied between the substrate and the coating to increase the interlayer adhesion.

Figure 2:
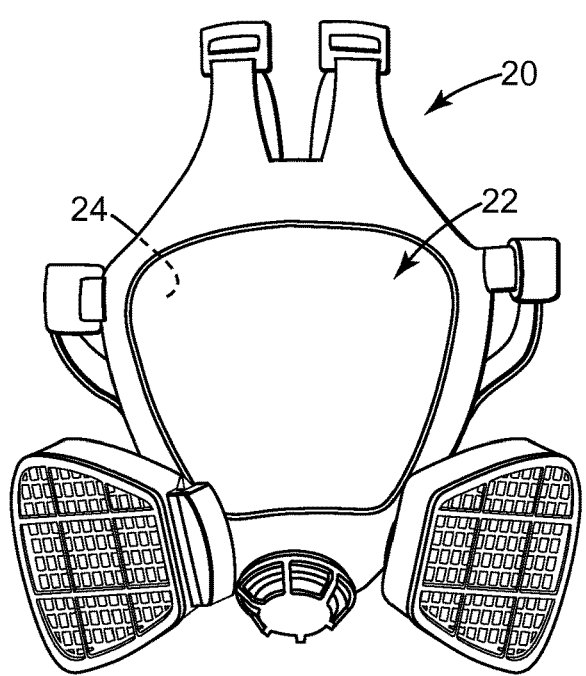
FIG. 2 illustrates an alternative embodiment of a respirator comprising a face shield having a transparent substrate with a coating of the present invention thereon.
Figure 3:
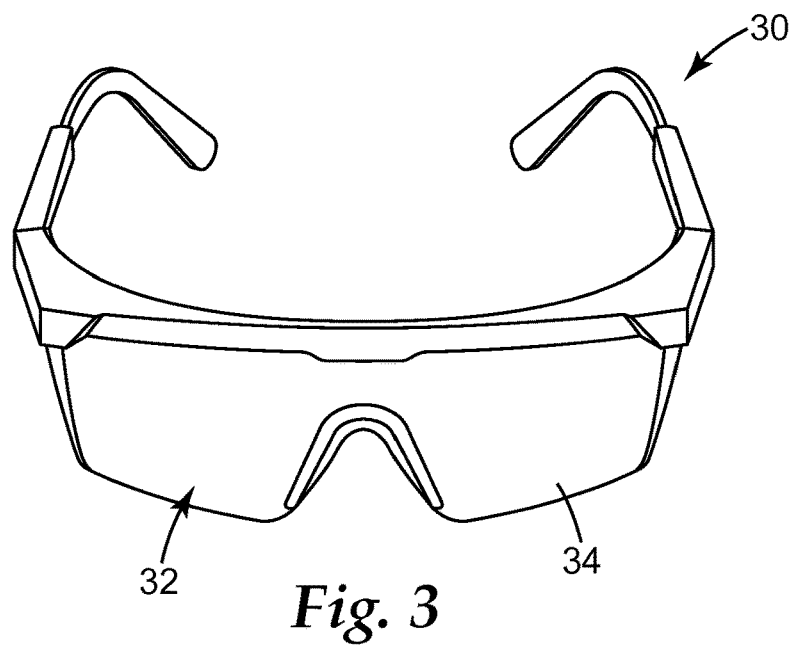
FIG. 3 illustrates eye glasses having a transparent substrate with a coating of the present invention on the outside surface of the transparent substrate.

Examples of face shields and eyewear incorporating the coating compositions of the present invention are shown in FIGS. 1-3. FIG. 1 illustrates a respirator 10 including a transparent substrate 12 as a face shield, which is used to protect the eyes and face of the wearer. The coating composition of the present invention can be applied to one side of the face shield, or to both the outside 14 and inside 16 of the transparent substrate 12. FIG. 2 illustrates an alternative embodiment of a respirator 20 having a transparent substrate 22 as a face shield with a coating of the present invention on the inside surface 24 of the transparent substrate 22. FIG. 3 illustrates eye glasses 30 having a transparent substrate 32 with a coating of the present invention on the outside surface 34 of the transparent substrate 32. In should be appreciated that coating of the present invention can be used on any conventional face shield, mask, visor, or the like, wherein, for example, antifogging characteristics are desired.

An example of another article that can include a coating composition of the present invention includes a solar panel (e.g., a photovoltaic cell module) comprising: a photovoltaic cell or an array of photovoltaic cells (a series of interconnected photovoltaic cells); and a coating composition disposed on the front side of solar panel for tansmission increase and for antisoiling and rinse-away cleaning.

In general, photovoltaic cells are semiconductor devices used to convert light into electricity and may be referred to as solar cells. Upon exposure to light, a photovoltaic cell generates a voltage across its terminals resulting in a consequent flow of electrons, the size of which is proportional to the intensity of the light impinging on the photovoltaic junction formed at the surface of the cell. Typically, a series of solar cell modules are interconnected to form a solar array (i.e., solar panel), which functions as a single electricity producing unit wherein the cells and modules are interconnected in such a way as to generate a suitable voltage in order to power a piece of equipment or supply a battery for storage, etc.

Semiconductor materials used in photovoltaic cells include crystalline or polycrystalline silicon or thin film silicon (e.g., amorphous, semicrystalline silicon) as well as non-silicon materials such as gallium arsenide, copper indium diselenide, organic semiconductors, CIGS, and the like. There are two types of photovoltaic cells, wafers and thin films. A wafer is a thin sheet of semiconductor material made by mechanically sawing it from a single crystal or multicrystal ingot or casting. Thin film based photovoltaic cells are continuous layers of semiconducting materials typically deposited on a substrate or supersubstrate using sputtering or chemical vapour deposition processes or the like.

Wafer and thin film photovoltaic cells are often fragile enough such that a module may require one or more supports. The support may be rigid, e.g., a glass plate rigid material, or it may be a flexible material, e.g., a metallic film and/or sheet of suitable polymer material such as a polyimide or polyethylene terephthalate. The support may be a top layer or superstrate, i.e., positioned between the photovoltaic cell and the light source, and which is transparent to light coming from the light source. Alternatively or in addition thereto, the support may be a bottom layer positioned behind the photovoltaic cell.

Figure 4:
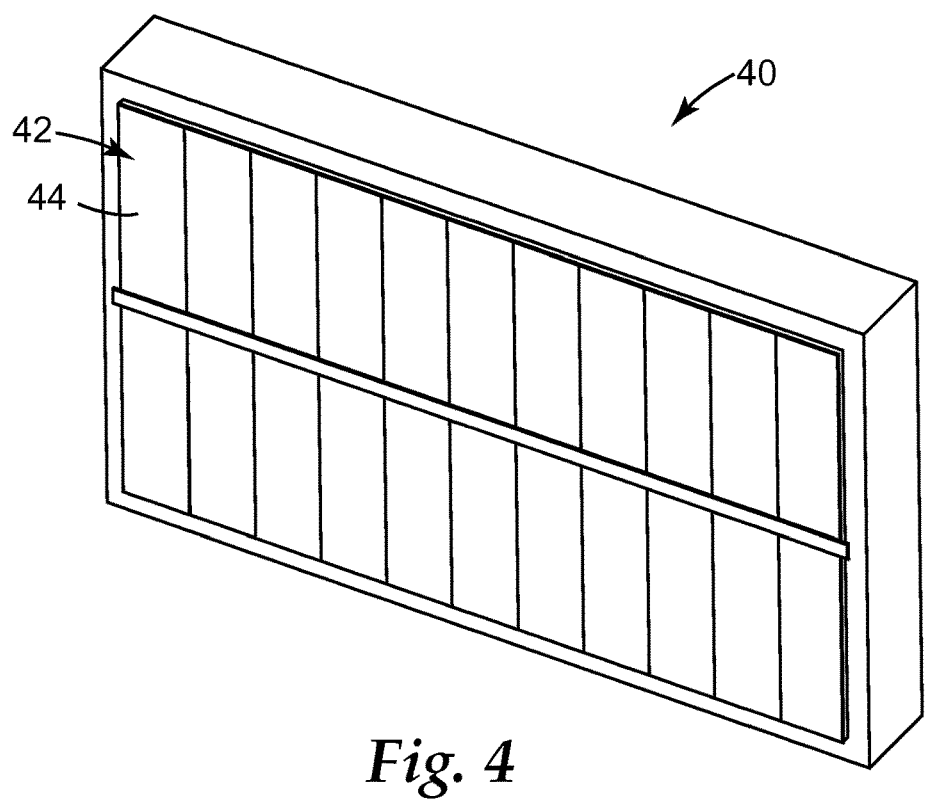
FIG. 4 show schematic representation of a solar panel with a solar panel having a coating of the present invention on the front substrate covering the solar panel.

The coating composition of the present invention may be coated on the front side of a solar panel. The preferred coating thickness is in a range of 100 nm to 200 nm for antireflective coatings. FIG. 4 shows a perspective schematic of a solar panel 40 having a front substrate 42 made of glass coated with a coating of the present invention 44.

The following items are provided.

Item 1 is a method of modifying a substrate surface, the method comprising: applying a coating composition to a substrate; and drying the coating composition to form a hydrophilic coating on the substrate. The coating composition comprises nanoparticles comprising functional groups attached to their surface through covalent bonds, wherein the functional groups comprise: amine groups, protected amine groups, or combinations thereof; amine-reactive groups; and optional hydrophilic groups; an optional surfactant; and a liquid medium comprising water and no greater than 30 wt-% organic solvent, if present, based on the total weight of liquid medium. The coated substrate demonstrates improvement, relative to the uncoated substrate, in at least one characteristic selected from the group consisting of antifogging, antireflective, easy-cleaning, and antistatic characteristics.

Item 2 is the method of item 1 wherein the amine and/or protected amine groups are covalently bonded to one portion of nanoparticles and the amine-reactive groups are covalently bonded to a different portion of nanoparticles.

Item 3 is the method of item 2 wherein the coating composition comprises: a portion of the nanoparticles comprising covalently bonded amine groups; and a different portion of the nanoparticles comprising covalently bonded epoxy groups.

Item 4 is the method of any one of items 1 through 3 wherein the nanoparticles have an average particle size of no greater than 60 nm.

Item 5 is the method of item 3 wherein the nanoparticles have an average particle size of no greater than 20 nm.

Item 6 is the method of any one of items 1 through 5 wherein at least a portion of the nanoparticles comprise silica nanoparticles.

Item 7 is the method of any one of items 1 through 6 wherein at least a portion of the nanoparticles comprise those bearing covalently bonded hydrophilic groups.

Item 8 is the method of item 7 wherein the hydrophilic groups are selected from the group consisting of carboxylate groups, structural units bearing multiple carboxylate groups, sulfate half-ester groups, structural units bearing multiple sulfate half-ester groups, sulfonate groups, structural units bearing multiple sulfonate groups, phosphate mono- and/or diester groups, structural units bearing multiple phosphate mono and/or diester groups, phosphonate groups, structural units bearing multiple phsphonate groups, acids thereof, and combinations thereof.

Item 9 is the method of item 7 wherein the hydrophilic groups are selected from the group consisting of quaternary ammonium groups, quaternary phosphonium groups, tertiary sulfonium groups, hydroxyl groups, polyethylene oxide groups, combinations thereof, and structural units bearing multiples thereof.

Item 10 is the method of item 7 wherein the hydrophilic groups are charged.

Item 11 is the method of item 7 wherein the hydrophilic groups are present on a particle surface in the coating composition in an amount equivalent to at least 1 mole-% of the total molar functional groups on said surface.

Item 12 is the method of any one of items 1 through 11 wherein the amine groups are present on a particle surface in the coating composition in an amount equivalent to at least 3 mole-% of the total molar functional groups on said surface.

Item 13 is the method of any one of items 1 through 12 wherein the amine-reactive groups are present on a particle surface in the coating composition in an amount equivalent to at least 3 mole-% of the total molar functional groups on said surface.

Item 14 is the method of any one of items 1 through 13 wherein the amine groups and the amine-reactive groups are present in the coating composition in an approximately equimolar amount.

Item 15 is the method of any one of items 1 through 14 wherein the coating composition is at a pH of 3 to 8.

Item 16 is the method of any one of items 1 through 15 wherein the coating composition comprises at least 0.1 wt-% nanoparticles and no greater than 30 wt-% nanoparticles, based on the total weight of the coating composition.

Item 17 is the method of any one of items 1 through 16 wherein the coating composition comprises at least 0.1 wt-% surfactant, based on the total weight of the coating composition.

Item 18 is the method of any one of items 1 through 17 wherein a dried coating provides antifogging, antireflective, easy-cleaning, and/or antistatic characteristics to the substrate for at least 24 hours.

Item 19 is an article comprising a substrate surface modified using the method of any one of items 1 through 18.

Item 20 is a coating composition comprising: nanoparticles comprising functional groups attached to the surface through covalent bonds; an optional surfactant; and a liquid medium comprising water and no greater than 30 wt-% organic solvent, if present, based on the total weight of liquid medium. The functional groups comprise: amine groups, protected amine groups, or combinations thereof; amine-reactive groups; and optional hydrophilic groups. The coating composition provides a hydrophilic coating to a substrate on which it is coated and dried, having an improvement, relative to an uncoated substrate, in at least one characteristic selected from the group consisting of antifogging, antireflective, easy-cleaning, and antistatic characteristics.

Item 21 is the coating composition of item 20 wherein the amine and/or protected amine groups are covalently bonded to one portion of nanoparticles and the amine-reactive groups are covalently bonded to another different portion of nanoparticles.

Item 22 is the coating composition of item 21 comprising: a portion of the nanoparticles comprising covalently bonded amine groups; and a different portion of the nanoparticles comprising covalently bonded amine-reactive groups.

Item 23 is the coating composition of any one of items 20 through 22 wherein the nanoparticles have an average particle size of no greater than 60 nm.

Item 24 is the coating composition of item 23 wherein the nanoparticles have an average particle size of no greater than 20 nm.

Item 25 is the coating composition of any one of items 20 through 24 wherein at least a portion of the nanoparticles comprise silica nanoparticles.

Item 26 is the coating composition of any one of items 20 through 25 wherein at least a portion of the nanoparticles comprise those bearing covalently bonded hydrophilic groups.

Item 27 is the coating composition of item 26 wherein the hydrophilic groups are selected from the group consisting of carboxylate groups, structural units bearing multiple carboxylate groups, sulfate half-ester groups, structural units bearing multiple sulfate half-ester groups, sulfonate groups, structural units bearing multiple sufonate groups, phosphate mono- and/or diester groups, structural units bearing multiple phosphate mono and/or diester groups, phosphonate groups, structural units bearing multiple phsphonate groups, acids thereof, and combinations thereof.

Item 28 is the coating composition of item 26 wherein the hydrophilic groups are selected from the group consisting of quaternary ammonium groups, quaternary phosphonium groups, tertiary sulfonium groups, hydroxyl groups, polyethylene oxide groups, combinations thereof, and structural units bearing multiples thereof.

Item 29 is the coating composition of item 26 wherein the hydrophilic groups are charged.

Item 30 is the coating composition of item 26 wherein the hydrophilic groups are present on a particle surface in the coating composition in an amount equivalent to at least 1 mole-% of the total molar functional groups on said surface.

Item 31 is the coating composition of any one of items 20 through 30 wherein the amine groups are present on a particle surface in the coating composition in an amount equivalent to at least 3 mole-% of the total molar functional groups on said surface.

Item 32 is the coating composition of any one of items 20 through 31 wherein the amine-reactive groups are present on a particle surface in the coating composition in an amount equivalent to at least 3 mole-% of the total molar functional groups on said surface.

Item 33 is the coating composition of any one of items 20 through 32 wherein the amine groups and the amine-reactive groups are present in the coating composition in an approximately equimolar amount.

Item 34 is the coating composition of any one of items 20 through 33 which is at a pH of 3 to 8.

Item 35 is the coating composition of any one of items 20 through 34 comprising at least 0.1 wt-% and no greater than 30 wt-% nanoparticles, based on the total weight of the coating composition.

Item 36 is the coating composition of any one of items 20 through 35 comprising no greater than 20 wt-% nanoparticles, based on the total weight of the coating composition.

Item 37 is the coating composition of any one of items 20 through 36 comprising at least 0.1 wt-% surfactant, based on the total weight of the coating composition.

Item 38 is the coating composition of any one of items 20 through 37 wherein a dried coating provides antifogging, antireflective, easy-cleaning, and/or antistatic characteristics to the substrate for at least 24 hours.

Item 39 is an article comprising a substrate surface modified using the coating composition of any one of items 20 through 38.

Item 40 is a kit for modifying a substrate surface. The kit comprises at least one container comprising a first composition and at least one container comprising a second composition. The first composition comprises nanoparticles; an optional surfactant; and water. The nanoparticles comprise functional groups attached to the surface through covalent bonds, wherein the functional groups comprise: amine groups, protected amine groups, or combinations thereof; and optional hydrophilic groups. The second composition comprises nanoparticles; an optional surfactant; and water. The nanoparticles comprise functional groups attached to the surface through covalent bonds, wherein the functional groups comprise: amine-reactive groups; and optional hydrophilic groups. The coating compositions when combined, applied to a substrate, and dried, provide a hydrophilic coating on the substrate that demonstrates improvement, relative to an uncoated substrate, in at least one characteristic selected from the group consisting of antifogging, antireflective, easy-cleaning, and antistatic characteristics.

Item 41 is an article comprising a substrate comprising at least a portion of at least one surface coated with a hydrophilic coating, wherein the hydrophilic coating comprises a dendritic network comprising one or more types of nanoparticles interconnected through covalent chemical bonds formed by the reaction of functional groups covalently bonded to said nanoparticles, wherein the functional groups comprise amine groups, protected amine groups, or combinations thereof, and amine-reactive groups; wherein the coated substrate demonstrates improvement, relative to the uncoated substrate, in at least one characteristic selected from the group consisting of antifogging, antireflective, easy-cleaning, and antistatic characteristics.

Item 42 is the article of item 41 which is a personal protection article.

Item 43 is the article of item 41 which is a solar panel.

Item 44 is the article of item 43 wherein the substrate is glass.

Item 45 is the article of item 43 wherein the glass is tempered.

Item 46 is the article of any one of items 41 through 45 wherein the amine and/or protected amine groups are covalently bonded to one portion of nanoparticles and the amine groups are covalently bonded to another different portion of nanoparticles prior to reaction.

Item 47 is a method of functionalizing an aqueous dispersion of silica nanoparticles with amino groups. The method comprises: adjusting the pH of an aqueous dispersion of silica nanoparticles to at least 10.5 to form negatively charged silica nanoparticles; combining the negatively charged silica nanoparticles with an alkoxy aminoalkyl-substituted organosilane compound comprising an alkoxysilyl end; allowing the alkoxy aminoalkyl-substituted organosilane compound to react with the negatively charged silica nanoparticles for a time effective to cause the alkoxysilyl end of the alkoxy aminoalkyl-substituted organosilane compound to preferentially react with the negatively charged silica surface.

EXAMPLES

Unless otherwise indicated, all chemical reagents and solvents were or can be obtained from Aldrich Chemical Co., Milwaukee, Wis. All parts, percentages, or ratios specified in the examples are by weight, unless specified otherwise.

Silica nanoparticles dispersions 1034a (20-nm), 2327 (20-nm), 1050 (20-nm), 1115 (4-nm) and 2326 (5-nm) were obtained from Nalco Company, Naperville, Ill.

Aqueous organsilanol-sulfonic acid sodium salt (NaOSi $(OH)_2(CH_2)_3SO_3Na$, 12.1 wt %, pH=13.1) (SAS), 3-(glycidoxypropyl)-trimethoxysilane, (GPS, 97%), 3-(glycidoxypropyl)-trimethoxysilane (KH560, 97%), 3-(2-aminoethyl) aminopropyl trimethoxysilane (AEAPTMS), trimethoxysilylpropyl-N,N,N-trimethyl ammonium chloride (TTMS, 50% in methyl alcohol), and N-(trimethoxysilylpropyl)ethylenediamine triacetic acid (EDTAS) were obtained from Gelest Inc., Morrisville, Pa. or from Zhejiang Chem-Tech Group Co., Ltd. Hangzhou, Zhejiang Province, China, or from Dow Corning Company, Midland, Mich.

Tetraethoxysilane (TEOS, 99.9%) was obtained from Alfa Aesar, Ward Hill, Mass.

Polyethylene terephthalate (PET) film was obtained from E.I. DuPont de Nemours, Wilmington, Del. under the trade designation "MELINEX 618," and having a thickness of 5.0 mils and a primed surface.

Polycarbonate (PC) film is available under the tradenames LEXAN 8010 (0.381-mm), 8010SHC (1.0-mm) and OQ92 from GE Advanced Materials Specialty Film and Sheet, Pittsfield, Mass.).

PELLATHENE 2363 is polyether-based polyurethane, available from Dow Chemical, Midland Mich.

Polyvinyl chloride (PVC) film was 3M™ SCOTCHCAL Luster Overlaminate 8519, 1.25 mil, available from the 3M Company, St. Paul, Minn.

Antifogging Performance Test

Antifogging performance was evaluated by exposing a coated sample surface to water vapor under various conditions. The indicated substrates were coated using a blocked coater or a Meyer bar with a 1-mil gap and 5 wt-% silica dispersions (total silica weight), providing a dry coating thickness in a range of 100-200 nm. The coated samples were heated to 80-100° C. for 5 min to 10 min to effect drying.

The dried coated surface, kept at room temperature was exposed to water vapor residing above a container of water kept at 15° C. to 20° C. Coatings were considered antifogging if a coated surface did not accumulate small, condensed water droplets in sufficient quantity to significantly reduce the transparency of the sample such that it could not be clearly seen through, immediately after holding the sample above the water container. A coating composition was regarded as antifogging even if a uniform water film or a very small number of large water droplets formed on the coated surface so long as the transparency of the coated sample was not significantly reduced such that it could not be readily seen through.

Contact Angle Measurements

Static water contact angle (i.e., "contact angle") measurements were made on the dried coated samples using as-received deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Tables 3 and 4. Drop volumes were 1 µL for static measurements.

Durability Test 1

The mechanical durability was evaluated by rubbing (by hand, with normal pressure) the coated surface with a dry and a wet KIMWIPE tissue as indicated in the Examples. The numbers reported in Table 3 and 4 refer to the number of wipes required to visibly remove the coating, as judged by light transmission; i.e., the coating scratched after "x" number of rubs with a dry KIMWIPE, and "y" number of rubs with wet KIMWIPE.

Durability Test 2

The mechanical durability was evaluated by forcibly rubbing (by hand, with much higher pressure than in Durability Test 1) the coated surface with a dry and a wet KIMWIPE tissue as indicated in the Examples. The numbers reported in tables 3 and 4 refer to the number of wipes required to visibly remove the coating, as judged by light transmission; i.e., the coating scratched after "x" number of rubs with a dry KIMWIPE, and "y" number of rubs with wet.

Durability Test 3

The mechanical durability was evaluated by wet and dry scrubbing. The dry scrubbing was performed by rubbing (by hand, with strong pressure) the coated surface twenty times with a paper towel. The wet scrubbing was performed on a Gardner Abrasion Tester (BYK-Gardner, Columbia, Md.) using a 1 kg weight with dishcloth and a 1.0% by weight detergent water solution (commercial dish detergent with anionic and nonionic surfactants from Shanghai Baimao Company) for 200-10,000 cycles. (See Table 6 and 7).

Easy Cleaning Test

This test was carried out by immersing the coated substrate sample into Gorecki Standard Carpet Soil available from Gorecki Manufacturing Inc., Milaca, Minn. and shaking it for 30 minutes. Alternatively the shaking was done for only 30 seconds if so indicated in the examples. The sample was removed from the soil container and rinsed with tap water for 1 minute at a speed of 750 millimeters per minute (mL/min). The samples were rated based on their appearance. A rating of "good" was given if the sample was completely clean, and a rating of "bad" was given if the sample was not clean (see Tables 3 and 4).

Antireflection Test 1

Samples were films with and without experimental treatments. Total and diffuse hemispherical transmittance data were measured for these samples. Measurements were made on a Perkin Elmer Lambda 900 spectrophotometer fitted with a PELA-1000 integrating sphere accessory (Perkin Elmer, Shelton, Conn., USA). This sphere is 150 mm (6 inches) in diameter and complies with ASTM methods E903, D1003, E308, et al. as published in "ASTM Standards on Color and Appearance Measurement," Third Edition, ASTM, 1991. Increase in Total Hemispherical Transmittance is interpreted as the result of reduced surface reflectance for the treated samples. "Yes" means that the transmission increases at least 0.5%, typically 3-5% per one side.

Antireflection Test 2

Samples were solar glass with and without experimental treatments. Total transmittance measurements were made on a HAZE-GARD DUAL haze and transmittance meter (BYK-Gardner, Columbia, Md., USA). The % transmission was directly read from the instrument as the average of the solar daylight wavelength range (CIE D65 standard illuminant) according to ASTM D1003. (See Table 6). To determine the effect of damp heat aging, the coated samples were aged for 2160 hours in a chamber at 85° C. and 85% relative humidity according to IEC61215 and the % light transmittance remeasured. (See Table 8).

Light to Electricity Conversion Ratio Test

A SPI-Sun Simulator 4600 solar panel tester (available from SPIRE, Bedford, Mass.) was used to test light to the electricity conversion ratio as measured by Pmax according to IEC61215. Pmax is a well defined industry parameter that is defined as the peak power in watts. A standard-size photovoltaic solar module (1574 mm by 794 mm) was used in the testing. The conversion ratio was determined before and after spray coating. The module was placed on the surface of the tester with the glass face down to the light source of the tester at 25° C. Pmax was calculated automatically by the SPIRE software. Table 9 represents various repeat trials with Example 25 after tempering. Two separate coatings (0005 and 0006) were done with ultrasonic atomizers and each sample tested five times.

Surface Resistivity Test

Surface resistivity of the coated samples were measured using a Hiresta HT260 (OAI, San Jose, Calif., USA) instrument with a setting of 100V for 10-second charge time at 25° C.

Surface Modified Nanoparticle (SMN) 1 (Epoxy Functionalized—20-Nm Nanoparticles):

Nalco 1050 silica nanoparticles (20 grams (g), 50 wt-%) and deionized water (80 g) were stirred together in a glass jar for 15 minutes (min). The pH of this mixture was adjusted to be within a range of 5 to 6 using 1N hydrochloric acid. GPS amount (as indicated in Table 1) in ethanol (5 g) was added drop-wise with stirring over a period of 1 to 1.5 hours (hrs) and the resulting mixture was continuously stirred for an additional 48 hrs at room temperature. Coating solution concentrations were about 10 wt-% and were used in the preparation of coating samples for examples described in Tables 3 and 4.

SMN 2 (Amine Functionalized—20-nm Nanoparticles):

Nalco 1050 silica nanoparticles (8 g, 50 wt-%) and deionized water (8 g) were stirred together in a glass jar for 15 min. The pH of this mixture was adjusted to about 11 using 1N NaOH. AEAPTMS (0.53 g) in ethanol (5 g) was added drop-wise with stirring over a period of 1 to 1.5 hrs and the resulting mixture was continuously stirred at 80° C. for an additional 14 hrs. The resulting solution (25%) was used in the preparation of coating samples for examples described in Tables 3 and 4.

SMN 3 (Amine Functionalized—5-nm Nanoparticles:

Nalco 2326 silica nanoparticles (25 g, 20 wt-%) and deionized water (25 g) were stirred together in a glass jar for 15 min. The pH of this mixture was adjusted to be about 11 using 0.1N sodium hydroxide. AEAPTMS (2.66 g) in ethanol (5 g) was added drop-wise with stirring over a period of 1 to 1.5 hrs and the resulting mixture was continuously stirred at 80° C. for an additional 14 hrs. The resulting solution (8 wt-%) was used in the preparation of coating samples for examples described in Tables 3 and 4.

SMN 4 (Amine Functionalized—4-nm Nanoparticles):

Nalco 1115 silica nanoparticles (30 g, 20 wt-%) and deionized water (30 g) were stirred together in a glass jar for 15 min. The pH of this mixture was adjusted to about 12 using 0.1N sodium hydroxide. AEAPTMS (3.63 g) in ethanol (5 g) was added drop-wise with stirring over a period of 1 to 1.5 hrs and the resulting mixture was continuously stirred at 20° C. for an additional 14 hrs. The resulting solution (14.3 wt-%) was used in the preparation of coating samples for examples described in Tables 3 and 4.

SMN 5-7 (Epoxy/Sulfonic Acid Functionalized—20-nm Nanoparticles):

Nalco 1050 silica nanoparticles (50 g, 10 wt-%) and deionized water (40 g) were stirred together in a glass jar for 15 min. The pH of this mixture was adjusted to be within a range of 7.2 to 7.8 using 1N hydrochloric acid. Appropriate amounts of GPS in ethanol (5 g) and SAS (3-(trihydroxysilyl)-1-propanesulfonic acid) in deionized water (2.5 g) were added drop-wise with stirring over a period of 1 to 1.5 hrs to obtain various ratios of epoxyalkoxysilane to sulfonic acid silanol (Table 1) and the resulting mixture was continuously stirred at 80° C. for an additional 12 hrs. The resulting solution (10 wt-%) was used in the preparation of coating samples for examples described in Tables 3 and 4.

SMN 8-10 (Amine/Sulfonic Acid Functionalized—4-nm Nanoparticles):

Nalco 1115 silica nanoparticles (25 g, 20 wt-%) and deionized water (25 g) were stirred together in a glass jar for 15 min. The pH of this mixture was adjusted to about 12 using 0.1N sodium hydroxide. Appropriate amounts of (AEAPTMS) in ethanol (2.5 g) and (SAS) in deionized water (2.5 g) were added drop-wise with stirring over a period of 1 to 1.5 hrs and the resulting mixture was continuously stirred at 80° C. for an additional 12 hrs. The resulting solution (14.3 wt-%) was used in the preparation of coating samples for examples described in Tables 3 and 4.

SMN 11-12 (Epoxy/TTMS Functionalized—20-nm Nanoparticles):

Nalco 1050 silica nanoparticles (10 g, 10 wt-%) in deionized water was stirred in a glass jar for 15 min. The pH of this mixture was adjusted to about 2.5 using 1N hydrochloric acid. Appropriate amounts of GPS in ethanol (5 g) and TTMS in deionized water (2.5 g) were added drop-wise with stirring over a period of 1 to 1.5 hrs and the resulting mixture was continuously stirred at room temperature for 12 hrs. The resulting solution (about 10 wt-%) was used in the preparation of coating samples for examples described in Table 3 and 4.

SMN 13-14 (Amine/TTMS Functionalized—4-nm Nanoparticles):

Nalco 1115 silica nanoparticles (25 g, 10 wt-%) in deionized water was stirred in a glass jar for 15 minutes. The pH of this mixture was adjusted to be within a range of 11 to 12 using 1N potassium hydroxide. Appropriate amounts of AEAPTMS in ethanol (5 g) and TTMS in deionized water (2.5 g) were added drop-wise with stirring over a period of 1 to 1.5 hrs and the resulting mixture was continuously stirred at 80° C. for an additional 12 hrs. The resulting solution (about 10 wt-%) was used in the preparation of coating samples for examples described in Table 3 and 4.

SMN 15 (Epoxy/EDTAS Functionalized—20-nm Nanoparticles):

Nalco 1050 silica nanoparticles (10 g, 10 wt-%) in deionized water was stirred in a glass jar for 15 min. The pH of this mixture was adjusted to about 2.5 using 1N hydrochloric acid. Appropriate amounts of GPS in ethanol (5 g) and EDTAS in deionized water (2.5 g) were added drop-wise with stirring over a period of 1 to 1.5 hrs and the resulting mixture was continuously stirred at room temperature for 12 hrs. The resulting solution (about 10 wt-%) was used in the preparation of coating samples for examples described in Table 3 and 4.

SMN 16 (Amine/EDTAS Functionalized—4-nm Nanoparticles):

Nalco 1115 silica nanoparticles (25 g, 10 wt-%) in deionized water was stirred in a glass jar for 15 min. The pH of this mixture was adjusted to be within a range of 11 to 12 using 1N potassium hydroxide. Appropriate amounts of AEAPTMS in ethanol (5 g) and EDTAS in deionized water (2.5 g) were added drop-wise with stirring over a period of 1 to 1.5 hrs and the resulting mixture was continuously stirred at 80° C. for an additional 12 hrs. The resulting solution (about 10 wt-%) was used in the preparation of coating samples for examples described in Table 3 and 4.

SMN-17 (Acrylic/Sulfonic Acid Functionalized—20-nm Nanoparticles):

Nalco 1050 silica nanoparticles (2 g, 10 wt-%) in deionized water was stirred together with SAS (3-(trihydroxysilyl)-1-propanesulfonic acid, 157.4 mg) in deionized water in ethanol (5 g), and 3-acryloxypropyl trimethoxysilane (94.4 mg) was added, and the resulting mixture was continuously stirred at 80° C. for 4-6 hrs in a sealed reaction vessel. The resulting solution (10 wt-%) was used in the preparation of coating samples for examples described in Tables 3 and 4.

SMN-18 (Amine Functionalized—20-nm Nanoparticles):

Nalco 1050 silica nanoparticles (8 g, 50 wt-%) and deionized water (8 g) were stirred together in a glass jar for 15 min. The pH of this mixture was adjusted to about 11 using 1N NaOH. AEAPTMS (0.27 g) in ethanol (5 g) was added drop-wise with stirring over a period of 1 to 1.5 hrs and the resulting mixture was continuously stirred at 80° C. for an additional 14 hrs. The resulting solution (25%) was used in the preparation of coating samples for examples described in Tables 3 and 4.

SMN-19 (Epoxy Functionalized—20-nm Nanoparticles with SMN 18):

SMN 1 was mixed with SMN 18 and bare silica Nanoparticle (1115) in a 1:1:1 ratio in 5 to 10 wt % aqueous solution. The pH of this mixture was adjusted to be within a range of 3 to 5 using 1N hydrochloric acid. This mixture was used in the preparation of coating samples for examples described in Tables 3 and 4. Coating solutions were coated on PET substrate using a Meyer bar #6 to obtain coatings with 0.6 micron thickness when dry. The coated samples were then dried at 120° C. for 5 to 30 minutes.

SMN-20 (Epoxy Functionalized—20-nm Nanoparticles with SMN-18 and Bare (1115) Nanoparticles):

SMN 1 was mixed with SMN 18 and bare silica Nanoparticle (1115) in a 1:1:1 ratio. The pH of this mixture was adjusted to be within a range of 3 to 5 using 1N hydrochloric acid. This mixture was used in the preparation of coating samples for examples described in Tables 3 and 4. Coating solutions were coated on PET substrate using a Meyer bar #6 to obtain coatings with 0.6 micron thickness when dry. The coated samples were then dried at 120° C. for 5 to 30 minutes.

SMN-21 (Epoxy Functionalized—20-nm Nanoparticles (SMN 1) with SMN 18 and TEOS):

SMN 1 was mixed with SMN 18 and TEOS in a 1:1:1 ratio in 5 to 10 wt % aqueous solution. The pH of this mixture was adjusted to be within a range of 3 to 5 using 1N hydrochloric acid. This mixture was used in the preparation of coating samples for examples described in Tables 3 and 4. Coating solutions were coated on PET substrate using a Meyer bar #6 to obtain coatings with 0.6 micron thickness when dry. The coated samples were then dried at 120° C. for 5 to 30 minutes.

SMN-22 (Epoxy Functionalized—20-nm Nanoparticles):

Nalco 1050 silica nanoparticles (80.5 grams (g), 50 wt-%) and deionized water (328.5 g) were stirred together in a glass jar for 15 minutes (min). The pH of this mixture was adjusted to 1.49 using concentrated hydrochloric acid. 3.05 Grams (g) GPS was added drop-wise with stirring over a period of 1 to 1.5 hours (hrs) and the resulting mixture was continuously stirred overnight at 60° C. Coating solution concentrations were about 10 wt-% and were used in the preparation of coating samples for Examples 25-27.

SMN-23 (Amine Functionalized—5-nm Nanoparticles:

Nalco 2326 silica nanoparticles (304.5 g, 20 wt-%) and deionized water (306.8 g) were stirred together in a glass jar for 15 min. The pH of this mixture was adjusted to be about 11 using 2N sodium hydroxide solution. AEAPTMS (2.49 g) was added drop-wise with stirring over a period of 1 to 1.5 hrs and the resulting mixture was continuously stirred at 60° C. overnight. The resulting solution (7.5 wt-%) was used in the preparation of coating samples for Examples 25 and 26.

SMN-24 (Epoxy Functionalized—40-100 nm Nanoparticles):

Nissan Chemicals STOUP 40-100 nm acicular silica nanoparticles (10.0 g, 15 wt-% aqueous) and deionized water (10 g) were stirred together in a glass jar for 15 min. The pH of this mixture was adjusted to 1.56 using 1N $HNO_3$. 3-Glycidoxypropyl trimethoxysilane (11.0 g, KH560, Zhejiang Chemical Co. Ltd.) was added drop-wise with stirring over a period of 1 to 1.5 hrs and the resulting mixture was continuously stirred at 60° C. overnight. Coating solution concentration was about 7.5 wt-% and was used in the preparation of coating for Example 27.

1. Coating solutions were coated on substrates using a Meyer bar #3 to obtain a dry coating thickness of about 100-150 nm. The coated samples were then dried at 100° C. for 10 minutes.

Coating solutions for Examples 21-24 were coated on PET substrate using a Meyer bar #6 to obtain coatings with 0.6-micron thickness when dry. The coated samples were then dried at 120° C. for 5 to 30 minutes.

Examples 25-27

Coating solutions (2-3 wt-%) were prepared by mixing appropriate amounts of SMN-22 and SMN-23 with water and surfactants to improve wetting. Example 25 was prepared by gradually adding 5.5 g SMN-22 to 10 g SMN-23. Then 46 g deionized water was added to dilute the solution followed by the addition of 0.23 g of a 10% solution of TRITON BG10, 0.11 g of a 5% solution of RHODOCAL DS-10 and 0.21 g of a 10% solution of CAPB-30S. Example 26 was prepared exactly as in Example 25 except that 11 g SMN-22 was mixed with 10 g SMN-23. The same surfactants and amounts and water was used in both examples. Example 27 was prepared by gradually adding 0.26 g SMN-24 to 10 g of the Example 25 formulation. Example 27 thus represents a mixture with only a small amount of acicular particles blended with non-acicular particles. Coating solutions were spray coated (simple mist sprayer) on the smooth side of solar glass substrates (Zhejiang Flat Mirror Glass Co. Ltd. (FLT)) and heated at various temperatures for specific times. Tables 6-8 indicate the % transmittance after coating and heating, the results of wet and dry durability tests and aging tests.

Example 25 was also coated using a commercial ultrasonic atomizer and sprayer using 10 different spray fluxes. In this case the increase in % transmittance after coating and heating the glass at 200° C./3 min was 1.32-1.59 vs. the uncoated glass. The % transmittance increase after coating and tempering the glass at 700-730° C./3 min was 1.36-1.85 vs. the uncoated glass. Thus for example 25 there was seen an increase of % transmittance of 0-0.52 when tempered at 700-730° C./3 min vs. the % tranmittance from coating and heating at 200° C./3 min. There was not a strong correlation between spray flux and increase in transmittance although

TABLE 1

| SMN No. | GPS (g) | SAS (g) | AEAPTMS (g) | TTMS (g) | EDTAS | GPS:SAS | AEAPTMS:SAS | GPS:TTMS | AEAPTMS:TTMS | GPS:EDTAS | AEAPTMS:EDTAS |
|---|---|---|---|---|---|---|---|---|---|---|---|
| 1 | 0.22 | | | | | | | | | | |
| 2 | | 0.13 | | | | | | | | | |
| 3 | | 0.51 | | | | | | | | | |
| 4 | | 0.66 | | | | | | | | | |
| 5 | 1.08 | 0.13 | | | | 90:10 | | | | | |
| 6 | 0.9 | 0.31 | | | | 75:25 | | | | | |
| 7 | 0.6 | 0.63 | | | | 50:50 | | | | | |
| 8 | | 0.33 | 2.72 | | | | 90:10 | | | | |
| 9 | | 0.84 | 2.27 | | | | 75:25 | | | | |
| 10 | | 1.67 | 1.51 | | | | 50:50 | | | | |
| 11 | 0.54 | | | 0.13 | | | | 90:10 | | | |
| 12 | 0.3 | | | 0.66 | | | | 50:50 | | | |
| 13 | | | 1.36 | 0.35 | | | | | 90:10 | | |
| 14 | | | 0.76 | 1.75 | | | | | 50:50 | | |
| 15 | 0.12 | | | | 0.5 | | | | | 50:50 | |
| 16 | | | 0.3 | | 1.4 | | | | | | 50:50 |

Examples 1 to 24

Coating solutions (5 wt-%) were prepared by mixing appropriate amounts of SMN solutions as indicated in Table 1. generally a higher flux gave higher increases in transmittance. Example 25 thus consistently and surprisingly showed more of an increase in transmittance when tempered at 700-730° C./3 min than when heated to 200° C./3 min.

Table 9 represents various repeat trials with Example 25 after tempering. Two separate coatings (0005 and 0006) were done with ultrasonic atomizers and each sample tested five times to generate a Pmax.

Example 26, spray coated and heated to 700° C. for 5 min was evaluated using the "Easy Cleaning Test" (shaking for 30 seconds only) and the rating was "good."

TABLE 2

| Example No. | 100 | 70:30 | 50:50 | 30:70 |
|---|---|---|---|---|
| 1 | | | SMN1:SMN2 | |
| 2 | | | SMN1:SMN2 | |
| 3 | | | SMN1:SMN2 | |
| 4 | | | SMN1:SMN2 | |
| 5 | | | SMN1:SMN2 | |
| 6 | | | SMN1:SMN3 | |
| 7 | | | SMN1:SMN3 | |
| 8 | | | SMN1:SMN3 | |
| 9 | | | SMN1:SMN3 | |
| 10 | | | SMN1:SMN3 | |
| 11 | | | | SMN1:SMN3 |
| 12 | SMN5 | | | |
| 13 | | | SMN5:SMN8 | |
| 14 | | | SMN6:SMN9 | |
| 15 | | SMN7:SMN10 | | |
| 16 | | SMN11:SMN13 | | |
| 17 | | | SMN12:SMN14 | |
| 18 | | SMN15:SMN16 | | |
| 19 | | | SMN4:SMN17 | |
| 20 | SMN19 | | | |
| 21 | SMN20 | | | |
| 22 | SMN21 | | | |

TABLE 3

| Ex. No. | Test Surface | Contact Angle | Antifog | Anti-reflection | Durability Wet | Durability Dry | Cleanability |
|---|---|---|---|---|---|---|---|
| 1 | PET | | | Yes | 100 | 30 | |
| 2 | Corona treated PET | | | Yes | 100+ | 100+ | |
| 3 | Polycarbonate | | | Yes | 100 | 10 | |
| 4 | Glass | | | Yes | 100 | 10 | |
| 5 | PVC | | | | 100 | 100 | Good |
| C1 | PVC | | | | | | Bad |
| 6 | PET | | | Yes | 100 | 60 | |
| 7 | Corona treated PET | | | Yes | 100+ | 100+ | |
| 8 | Polycarbonate | | | Yes | 20 | 10 | |
| 9 | Glass | | | Yes | 100 | 100 | |

TABLE 4

| Ex. No. | Test Surface | Contact Angle | Antifog | Anti-reflection | Durability Wet | Durability Dry | Surface Resistivity (Ohms/sq) |
|---|---|---|---|---|---|---|---|
| 10 | Corona treated PET | 28.1 | Moderate | Yes | 0 | 1 | |
| 11 | Corona treated PET | 16.1 | Moderate | Yes | 0 | 1 | |
| 12 | Corona treated PET | 7.1 | Yes | Yes | 0 | 1 | |
| 13 | Corona treated PET | 14.3 | Yes | Yes | 0 | 1 | |
| 14 | Corona treated PET | 9.2 | Yes | Yes | 0 | 10 | |
| 15 | Corona treated PET | 14.6 | Yes | Yes | 1 | 10 | |
| 16 | Corona treated PET | | | Yes | | | 1.74XE+10 |
| 17 | Corona treated PET | | | Yes | | | 9.77XE+08 |
| 18 | Corona treated PET | | | Yes | | | 3.27XE+07 |
| 19 | Corona treated PET | | | Yes | 0 | 1 | |

TABLE 5

| Ex. No. | Test Surface | Antifog | Durability Dry | Durability Wet |
|---|---|---|---|---|
| 20 | Corona treated PET | Moderate | 20 | 50 |
| 21 | Corona treated PET | Good | 100+ | 100+ |
| 22 | Corona treated PET | Poor | 100+ | 100+ |

TABLE 6

| Test conditions | Ex 25 | Ex 25 | Ex 26 | Ex 27 |
|---|---|---|---|---|
| Uncoated glass | 92.2 | 91.8 | 92.2 | 91.1 |
| 120° C./5 min | 93.5 | 92.7 | 93.4 | NT |
| 700° C./5 min | 93.8 | | 92.9 | 93.0 |
| Durability Test 3 dry scrub | 93.2 | 92.7 | 93.2 | NT |

*NT = not tested

TABLE 7

| Durability Test 3 wet scrub | Ex 25 (120° C.) | Ex 25 (700° C.) | Ex 26 (700° C.) |
|---|---|---|---|
| Uncoated glass | 92.0 | 91.2 | 92.2 |
| Before wet scrub | 93.1 | 92.3 | 93.2 |
| After 200 cycles | 93.4 | NT | 93.2 |
| After 500 cycles | 93.6 | NT | 93.2 |
| After 2500 cycles | NT | 92.4 | NT |
| After 10000 cycles | NT | 92.4 | NT |

TABLE 8

| Conditions | Example 26 700° C. heating | Example 25 120° C. heating |
|---|---|---|
| Uncoated glass | 91.9 | 91.9 |
| Before aging | 92.6 | 93.2 |
| 300 hrs | 93.1 | 94.3 |
| 940 hrs | 93.6 | 93.8 |
| 1800 hrs | 92.7 | 93.5 |
| 2160 hrs | 92.8 | 93.6 |

TABLE 9

| Example 25 Test Run # | Pmax (W) |
|---|---|
| M090327001-0005-01 | 181.80 |
| M090327001-0005-02 | 181.90 |
| M090327001-0005-03 | 182.20 |
| M090327001-0005-04 | 182.10 |
| M090327001-0005-05 | 181.80 |
| Average | 181.96 |
| M090327001-0006-01 | 181.80 |
| M090327001-0006-02 | 182.00 |
| M090327001-0006-03 | 181.60 |
| M090327001-0006-04 | 182.00 |
| M090327001-0006-05 | 181.90 |
| Average | 181.86 |
| Uncoated Average | 179.36 |
| Average Increase (%) | 1.40 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A kit for modifying a substrate surface, the kit comprising:
   at least one container comprising a first composition comprising:
   inorganic nanoparticles comprising colloidal silica, colloidal zirconia, colloidal alumina, colloidal ceria, colloidal tin oxide, or colloidal titanium dioxide, the inorganic nanoparticles having functional groups attached to the surface through covalent bonds, wherein the functional groups comprise:
   amine groups, protected amine groups, or combinations thereof; optional hydrophilic groups; an optional surfactant; and water; wherein the first composition comprises 0.1 wt-% to 30 wt-% inorganic nanoparticles; and
   at least one container comprising a second composition comprising:
   nanoparticles comprising functional groups attached to the surface through covalent bonds, wherein the functional groups comprise: amine-reactive groups; optional hydrophilic groups; an optional surfactant; and water;
   wherein the first and second compositions when combined, applied to a substrate, and dried, provide a hydrophilic coating on the substrate that demonstrates improvement, relative to an uncoated substrate, in at least one characteristic selected from the group consisting of antifogging, antireflective, easy-cleaning, and antistatic characteristics.

2. The kit of claim 1 wherein a portion of the nanoparticles of the first composition comprise silica nanoparticles.

3. The kit of claim 1 wherein the nanoparticles of the first composition have a different average diameter than the nanoparticles of the second composition.

4. The kit of claim 1 wherein the functional groups of the second composition comprise alpha,beta-unsaturated groups.

5. The kit of claim 4 wherein the functional groups of the first composition comprise amine groups and the functional groups of the second composition comprise epoxy groups.

6. The kit of claim 1 wherein at least a portion of the nanoparticles of at least one of the first composition and the second composition comprises nanoparticles bearing covalently bonded hydrophilic groups selected from the group consisting of carboxylate groups, structural units bearing multiple carboxylate groups, sulfate half-ester groups, structural units bearing multiple sulfate half-ester groups, sulfonate groups, structural units bearing multiple sulfonate groups, phosphate mono- and/or diester groups, structural units bearing multiple phosphate mono and/or diester groups, phosphonate groups, structural units bearing multiple phosphonate groups, acids thereof, and combinations thereof.

7. The kit of claim 1 wherein the amine groups are present on a particle surface in the first composition in an amount equivalent to at least 3 mole-% of the total molar functional groups on said surface.

8. The kit of claim 1 wherein the amine-reactive groups are present on a particle surface in the second composition in an amount equivalent to at least 3 mole-% of the total molar functional groups on said surface.

9. The kit of claim 1, wherein a variability in the size of the nanoparticles of the first composition is less than 25% of the mean particle size.

* * * * *